US010200259B1

(12) United States Patent
Pukish et al.

(10) Patent No.: US 10,200,259 B1
(45) Date of Patent: Feb. 5, 2019

(54) SYSTEMS AND METHODS FOR DETECTING OBSCURE CYCLIC APPLICATION-LAYER MESSAGE SEQUENCES IN TRANSPORT-LAYER MESSAGE SEQUENCES

(71) Applicant: Symantec Corporation, Mountain View, CA (US)

(72) Inventors: Michael Sylvester Pukish, Santa Clara, CA (US); Zhipeng Zhao, Sunnyvale, CA (US); Ernest Mugambi, Dublin, CA (US)

(73) Assignee: Symantec Corporation, Mountain View, CA (US)

( * ) Notice: Subject to any disclaimer, the term of this patent is extended or adjusted under 35 U.S.C. 154(b) by 248 days.

(21) Appl. No.: 15/271,494

(22) Filed: Sep. 21, 2016

(51) Int. Cl.
*H04L 12/26* (2006.01)
*H04L 29/08* (2006.01)

(52) U.S. Cl.
CPC .......... *H04L 43/045* (2013.01); *H04L 43/028* (2013.01); *H04L 69/329* (2013.01)

(58) Field of Classification Search
CPC .......... G06F 17/2235; G06F 17/30061; G06F 17/3053; G06F 17/30563; G06F 17/30598;
(Continued)

(56) References Cited

U.S. PATENT DOCUMENTS 7,015,811 B2 3/2006 Decker et al.
7,475,124 B2 1/2009 Jiang et al.
(Continued)

FOREIGN PATENT DOCUMENTS

CN 102571469 A 7/2012
CN 102893289 A 1/2013
EP 2515250 A1 10/2012

OTHER PUBLICATIONS

Mahoney, Network traffic anomaly detection based on packet bytes, Proceedings of the 2003 ACM symposium on Applied computing, pp. 346-350, Mar. 9, 2003.
(Continued)

*Primary Examiner* — Ninos Donabed
(74) *Attorney, Agent, or Firm* — FisherBroyles, LLP

(57) ABSTRACT

The disclosed computer-implemented method for detecting obscure cyclic application-layer message sequences in transport-layer message sequences may include (i) collecting a composite sequence of transport-layer messages that are exchanged between a first computing device and a second computing device over a single long-standing transport-layer connection, (ii) constructing a sequence graph from the composite sequence, (iii) traversing the sequence graph to discover a first obscure cyclic sequence of application-layer messages in the composite sequence, and (iv) performing a security action using a representation of the first obscure cyclic sequence. In some examples, the composite sequence may include the first obscure cyclic sequence and a second obscure cyclic sequence of application-layer messages that were exchanged by the first computing device and the second computing device, and each message in the composite sequence may include a distinguishing feature. Various other methods, systems, and computer-readable media are also disclosed.

20 Claims, 10 Drawing Sheets

(58) Field of Classification Search
CPC ......... G06F 17/30958; H04L 2463/121; H04L 41/0893; H04L 41/145; H04L 41/22; H04L 43/045; H04L 43/062; H04L 63/06; H04L 63/1408; H04L 63/1416
See application file for complete search history.

(56) References Cited

U.S. PATENT DOCUMENTS

| | | | |
|---|---|---|---|
| 7,673,074 B1 | 3/2010 | Sebastian et al. | |
| 7,861,300 B2 | 12/2010 | Arnold et al. | |
| 8,010,993 B1* | 8/2011 | Bartholomay | H04L 63/10 726/1 |
| 8,104,090 B1 | 1/2012 | Pavlyushchik | |
| 8,126,891 B2 | 2/2012 | Laxman et al. | |
| 8,341,745 B1 | 12/2012 | Chau et al. | |
| 8,478,575 B1* | 7/2013 | Kashai | G06F 17/5022 702/185 |
| 8,544,087 B1 | 9/2013 | Eskin et al. | |
| 8,566,938 B1 | 10/2013 | Prakash et al. | |
| 8,925,037 B2 | 12/2014 | Marino et al. | |
| 8,973,133 B1 | 3/2015 | Cooley | |
| 9,053,516 B2 | 6/2015 | Stempora | |
| 9,088,560 B1 | 7/2015 | Newstadt et al. | |
| 9,141,790 B2 | 9/2015 | Roundy et al. | |
| 9,148,441 B1 | 9/2015 | Tamersoy et al. | |
| 9,166,997 B1 | 10/2015 | Guo et al. | |
| 9,256,739 B1 | 2/2016 | Roundy et al. | |
| 9,332,030 B1 | 5/2016 | Pereira | |
| 9,384,066 B1 | 7/2016 | Leita et al. | |
| 9,473,380 B1 | 10/2016 | Bermudez et al. | |
| 9,529,990 B2 | 12/2016 | Newstadt et al. | |
| 9,582,669 B1 | 2/2017 | Shen et al. | |
| 9,747,551 B2* | 8/2017 | Wang | G06N 5/04 |
| 9,838,410 B2* | 12/2017 | Muddu | H04L 63/1425 |
| 9,843,596 B1* | 12/2017 | Averbuch | H04L 63/1416 |
| 9,900,332 B2* | 2/2018 | Muddu | G06N 99/005 |
| 2002/0124089 A1 | 9/2002 | Aiken et al. | |
| 2003/0126253 A1* | 7/2003 | Ewing | G06F 1/26 709/223 |
| 2004/0044771 A1 | 3/2004 | Allred et al. | |
| 2004/0059822 A1 | 3/2004 | Jiang et al. | |
| 2005/0030969 A1 | 2/2005 | Fredriksson | |
| 2005/0138413 A1 | 6/2005 | Lippmann et al. | |
| 2006/0034305 A1* | 2/2006 | Heimerdinger | H04L 63/1408 370/408 |
| 2006/0095573 A1 | 5/2006 | Carle et al. | |
| 2006/0236374 A1 | 10/2006 | Hartman | |
| 2007/0260965 A1* | 11/2007 | Schmidt | H04L 1/0045 714/799 |
| 2008/0020751 A1* | 1/2008 | Li | H04W 72/005 455/424 |
| 2008/0088408 A1 | 4/2008 | Backman | |
| 2008/0134327 A1 | 6/2008 | Bharrat et al. | |
| 2009/0144308 A1 | 6/2009 | Huie et al. | |
| 2009/0157365 A1 | 6/2009 | Higuchi et al. | |
| 2009/0265778 A1* | 10/2009 | Wahl | H04L 63/1416 726/13 |
| 2010/0083020 A1* | 4/2010 | Suzuki | G06F 1/3209 713/322 |
| 2010/0186088 A1 | 7/2010 | Banerjee et al. | |
| 2010/0192226 A1 | 7/2010 | Noel et al. | |
| 2010/0235879 A1 | 9/2010 | Burnside et al. | |
| 2011/0019774 A1 | 1/2011 | Furuta | |
| 2011/0047620 A1 | 2/2011 | Mahaffey et al. | |
| 2011/0083180 A1 | 4/2011 | Mashevsky et al. | |
| 2011/0302656 A1 | 12/2011 | El-Moussa | |
| 2011/0314546 A1 | 12/2011 | Aziz et al. | |
| 2011/0320617 A1 | 12/2011 | Annamalaisami et al. | |
| 2012/0144468 A1 | 6/2012 | Pratt et al. | |
| 2012/0203877 A1* | 8/2012 | Bartholomay | H04L 63/0227 709/221 |
| 2012/0233683 A1 | 9/2012 | Ibrahim et al. | |
| 2012/0272289 A1* | 10/2012 | Chang | H04L 67/2819 726/1 |
| 2013/0031037 A1 | 1/2013 | Brandt et al. | |
| 2013/0042294 A1 | 2/2013 | Colvin et al. | |
| 2013/0212659 A1 | 8/2013 | Maher et al. | |
| 2013/0333032 A1 | 12/2013 | Delatorre et al. | |
| 2014/0137188 A1* | 5/2014 | Bartholomay | G06Q 30/0251 726/3 |
| 2014/0226664 A1 | 8/2014 | Chen et al. | |
| 2014/0258379 A1 | 9/2014 | L'Heureux et al. | |
| 2014/0330977 A1 | 11/2014 | van Bemmel | |
| 2014/0365646 A1 | 12/2014 | Xiong | |
| 2015/0113638 A1 | 4/2015 | Valasek et al. | |
| 2015/0150124 A1 | 5/2015 | Zhang et al. | |
| 2015/0261655 A1 | 9/2015 | Versteeg et al. | |
| 2015/0281047 A1 | 10/2015 | Raju et al. | |
| 2015/0324457 A1* | 11/2015 | McLean | G06F 17/30985 707/758 |
| 2016/0046025 A1* | 2/2016 | Miyashita | B25J 11/008 700/264 |
| 2016/0092774 A1* | 3/2016 | Wang | G06N 5/04 706/12 |
| 2016/0261482 A1 | 9/2016 | Mixer et al. | |
| 2017/0118234 A1 | 4/2017 | Arora et al. | |
| 2017/0132406 A1* | 5/2017 | Torii | G06F 21/44 |

OTHER PUBLICATIONS

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks. pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

(56) References Cited

OTHER PUBLICATIONS

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.
Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.
Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, on or before Aug. 29, 2014.
CAN protocol specification; http://www.can-cia.org/index.php?id=164, as accessed Aug. 29, 2014, Oct. 17, 2010.
Controller Area Network (CAN) Overview; http://www.ni.com/white-paper/2732/en/, as accessed Aug. 29, 2014; National Instruments Corporation, Aug. 1, 2014.
Driver Feedback; https://play.google.com/store/apps/details?id=com.statefarm.driverfeedback, as accessed Aug. 29, 2014; State Farm Insurance, Android Apps on Google Play, Jun. 2, 2013.
Electronic control unit; https://en.wikipedia.org/wiki/Electronic_control_unit, as accessed Feb. 9, 2015; Wikipedia, Jul. 28, 2004.
EMI/ESD Protection Solutions for the CAN Bus; http://www.onsemi.com/pub_link/Collateral/AND8169-D.PDF, as accessed Aug. 29, 2014; Publication Order No. AND8169/D, ON Semiconductor, Semiconductor Components Industries, LLC, Jun. 2014—Rev. 2.
Emulation; https://en.wikipedia.org/wiki/Emulation, as accessed Feb. 9, 2015; Wikipedia,Dec. 3, 2003.
FlexRay Automotive Communication Bus Overview; http://www.ni.com/white-paper/3352/en/, as accessed Aug. 29, 2014; National Instruments Corporation, Aug. 21, 2009.
Hardware emulation; https://en.wikipedia.org/wiki/Hardware_emulation, as accessed Feb. 9, 2015; Wikipedia, Sep. 13, 2006.
Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.
Nathan Evans, et al; Systems and Methods for Detecting Anomalous Messages in Automobile Networks; U.S. Appl. No. 14/525,792, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
Regev; Automotive Ethernet Security Testing; http://standards.ieee.org/events/automotive/2014/20_Automotive_Ethernet_Security_Testing.pdf, as accessed Feb. 9, 2015, 2014.
Snapshot; https://www.progressive.com/auto/snapshot/, as accessed Aug. 29, 2014; Progressive Casualty Insurance Company, Mar. 8, 2013.
Vehicle bus; https://en.wikipedia.org/wiki/Vehicle_bus, as accessed Feb. 9, 2015; Wikipedia, May 12, 2005.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.
Wolf; Security in Automotive Bus Systems; http://www.weika.eu/papers/WolfEtAl_SecureBus.pdf, as accessed Aug. 29, 2014, 2004.
Yun Shen, et al; Systems and Methods for Detecting Discrepancies in Automobile-Network Data; U.S. Appl. No. 14/525,715, filed Oct. 28, 2014.
Bajpai, et al; Systems and Methods for Detecting Suspicious Microcontroller Messages; U.S. Appl. No. 15/143,284, filed Apr. 29, 2016.
Michael Pukish, et al; Systems and Methods for Detecting Transactional Message Sequences That are Obscured in Multicast Communications; U.S. Appl. No. 15/194,337, filed Jun. 27, 2016.
Vishal Bajpai et al.; System and Method for Identifying an Invalid Packet on a Controller Area Network (CAN) Bus; U.S. Appl. No. 15/056,864, filed Feb. 29, 2016.
Adam Glick, et al.; Systems and Methods for User-Directed Malware Remediation; U.S. Appl. No. 13/419,360, filed Mar. 13, 2012.
Carey Nachenberg, et al.; Systems and Methods for Neutralizing File-Format-Specific Exploits Included Within Files Contained Within Electronic Communications; U.S. Appl. No. 13/418,332, filed Mar. 12, 2012.
Leylya Yumer, et al.; Systems and Methods for Analyzing Zero-Day Attacks; U.S. Appl. No. 13/901,977, filed May 24, 2013.
Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.
Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.
William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.
Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.
Triumfant, Inc.; Detecting the Advanced Persistent Threat; Nov. 30, 2010; www.triumfant.com/advanced_persistent_threat.asp, as accessed Aug. 8, 2013.
EMC Corporation; Advanced Persistent Threat (APT) and Rootkit Detection; 2012; http://www.siliciumsecurity.com/advanced-persistent-threats-and-rootkits-detection/, as accessed Aug. 8, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).

(56) References Cited

OTHER PUBLICATIONS

Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).
Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.
Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, Fire Eye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworld.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5, 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; SYN flood; http://linux.about.com/cs/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.
Hobgood, et al., Advanced Automatic Crash Notifications and, Urgency Factors: Can We Standardize?, APCO 2011, PowerPoint Slides, Jul. 22, 2012.
Asi, et al., Black Box System Design, Dec. 14, 2010.

(56) References Cited

OTHER PUBLICATIONS

Ignacio Bermudez Corrales, et al; Systems and Methods for Identifying Compromised Devices Within Industrial Control Systems; U.S. Appl. No. 14/952,344, filed Nov. 25, 2015.

Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.

Caselli; Sequence-aware Intrusion Detection in Industrial Control Systems; CPSS'15, Proceedings of the 1st ACM Workshop on Cyber-Physical System Security, 2015.

Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.

Distributed control system; https://en.wikipedia.org/wiki/Distributed_control_system, as accessed Sep. 29, 2015; Wikipedia.

Garitano; A Review of Scada Anomaly Detection Systems; Advances in Intelligent and Soft Computing, 2016.

Ginter; Experience with Network Anomaly Detection on Industrial Networks; Industrial Control Systems Joint Working Group (ICSJWG), 2010.

Hadziosmanovi; N-Gram against the Machine: On the Feasibility of the N-Gram Network Analysis for Binary Protocols; Research in Attacks, Intrusions, and Defenses. 2012.

Kiss; Data Clustering-based Anomaly Detection in Industrial Control Systems; Intelligent Computer Communication and Processing, IEEE. 2014.

Mahoney; Phad: Packet Header Anomaly Detection for Identifying Hostile Network Traffic; https://cs.fit.edu/~mmahoney/paper3.pdf, as accessed Sep. 29, 2015.

Mantere; Network Traffic Features for Anomaly Detection in Specific Industrial Control System Network; Future Internet 2013, vol. 5 (6), MDPI.

Perdisci; McPAD : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.

Snort (software); https://en.wikipedia.org/wiki/Snort_(software), as accessed Sep. 29, 2015; Wikipedia.

The Bro Network Security Monitor; https://www.bro.org/, as accessed Sep. 29, 2015.

Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.

Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.

Walter Bogorad; Systems and Methods for Detecting Anomalies That Are Potentially Indicative of Malicious Attacks; U.S. Appl. No. 15/059,326, filed Mar. 3, 2016.

Aggarwal; Outlier Analysis; http://www.springer.com/us/book/9781461463955, as accessed Feb. 1, 2016, (2013).

Dunning; Practical Machine Learning: A New Look At Anomaly Detection; https://www.mapr.com/practical-machine-learning-new-look-anomaly-detection, as accessed Feb. 1, 2016, (Jul. 21, 2014).

Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).

Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).

Yolacan; Learning From Sequential Data for Anomaly Detection; https://repository.library.northeastern.edu/downloads/neu:349795, as accessed Feb. 1, 2016; Dissertation, (Oct. 2014).

K. Nyalkalkar et al., "A comparative study of two network-based anomaly detection methods," in 2011 Proceedings IEEE INFOCOM, 2011.

S. Sinha et al., "WIND: Workload-Aware INtrusion Detection," in Recent Advances in Intrusion Detection, D. Zamboni and C. Kruegel, Eds. Springer Berlin Heidelberg, 2006.

L. Huang et al., "In-network PCA and anomaly detection," in In NIPS, 2006.

N. Goldenberg et al., "Accurate modeling of Modbus/TCP for intrusion detection in SCADA systems," Int. J. Crit. Infrastruct. Prot., vol. 6, No. 2, Jun. 2013.

M.-K. Yoon et al., "Communication Pattern Monitoring: Improving the Utility of Anomaly Detection for Industrial Control Systems," in Internet Society, San Diego, CA, USA, 2014.

N. Borisov et al., "Generic Application-Level Protocol Analyzer and its Language," Microsoft Research, MSR-TR-2005-133, Feb. 2005.

Zhipeng Zhao et al.; Systems and Methods for Identifying Message Payload Bit Fields in Electronic Communications; U.S. Appl. No. 15/359,076, filed Nov. 22, 2016.

"Transmission Control Protocol", http://en.wikipedia.org/wiki/Transmission_Control_Protocol, as accessed Jul. 10, 2014, Wikipedia, (Dec. 18, 2003).

A. Greenberg, "Hackers Remotely Kill a Jeep on the Highway—With Me in It," WIRED, Jul. 21, 2015. [Online]. Available: http://www.wired.com/2015/07/hackers-remotely-kill-jeep-highway/. [Accessed: Mar. 30, 2016].

Extending schedulability analysis of Controller Area Network (CAN) for mixed (periodic/sporadic) messages (http://ieeexplore.ieee.org/document/6059010/); Sep. 5, 2011.

A structured approach to anomaly detection for in-vehicle networks (http://ieeexplore.ieee.org/stamp/stamp.jsp?arnumber=5604050); Aug. 23, 2010.

Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.

Vishal Bajpai et al.; Systems and Methods for Identifying Suspicious Controller Area Network Messages; U.S. Appl. No. 15/587,762, filed May 5, 2017.

Steven Noel et al.; Correlating Intrusion Events and Building Attack Scenarios Through Attack Graph Distances; 20th Annual Computer Security Applications Conference; ACSAC '04; Tucson, AZ, USA; Dec. 6-10, 2004.

Steven Noel et al., "Correlating Intrusion Events and Building Attack Scenarios Through Attack Graph Distances", Computer Security Applications Conference, 2004. $20^{th}$ Annual Tucson, AZ, USA Dec. 6-10, 2004, (Dec. 10, 2004), pp. 350-359.

\* cited by examiner

SYSTEMS AND METHODS FOR DETECTING OBSCURE CYCLIC APPLICATION-LAYER MESSAGE SEQUENCES IN TRANSPORT-LAYER MESSAGE SEQUENCES

BACKGROUND

Industrial Control Systems (ICSs) are often used to control the functionality of devices and/or machinery that perform manufacturing and/or production operations within an industrial environment. For example, a nuclear power plant may implement and/or rely on an ICS to regulate the production and/or distribution of electrical power. A typical ICS may include a collection of sensors, actuators, controllers, control valves, motors, robotic devices, and/or other computing devices that communicate using a specialized application-layer protocol that is designed for ICS environments. In many ICSs, application-layer messages are exchanged between ICS components using a standard transport-layer protocol such as the Internet protocol suite (also known as Transmission Control Protocol (TCP) over Internet Protocol (IP) or TCP/IP).

Anomaly detection is a traditional method for detecting suspicious communications within a network. Traditional anomaly-detection systems will often use baselines of cyclic message sequences to detect when abnormal (e.g., malicious) message sequences are present on a network. Before baselining a cyclic message sequence, a conventional anomaly-detection system will generally need to (i) understand the structure and/or purpose of each message in the cyclic message sequence and (ii) identify and collect many instances of the same cyclic message sequence from which a baseline may be derived.

While the network traffic in a typical ICS network is generally highly cyclic and predictable when compared to the network traffic in a typical Information Technology (IT) network, the task of determining baselines for normal cyclic application-layer message sequences in ICS networks has traditionally been difficult for conventional anomaly-detection technologies because the cyclic application-layer message sequences are often obscured. Cyclic application-layer message sequences are often obscured in ICS network traffic since (i) the application-layer protocols with which components of ICSs communicate are often proprietary or hidden and rarely documented and/or available to the public and (ii) cyclic application-layer message sequences in ICS networks are generally exchanged over a single transport-layer connection that is long lived and void of any semantic book-ending such as connection-establishment or connection-termination handshakes.

For at least these reasons, conventional anomaly-detection technologies generally do not understand the structure and/or purpose of the messages in the cyclic application-layer message sequences observed in ICS networks and generally are unable to identify and collect many instances of the same cyclic application-layer message sequence. Accordingly, conventional anomaly-detection technologies may be unable to baseline ICS network traffic and may be somewhat ineffective at identifying malfunctioning and/or compromised devices within ICSs, potentially leaving such systems susceptible to accidents and/or attacks. The instant disclosure, therefore, identifies and addresses a need for systems and methods for detecting obscure cyclic application-layer message sequences in transport-layer message sequences.

SUMMARY

As will be described in greater detail below, the instant disclosure describes various systems and methods for detecting obscure cyclic application-layer message sequences in transport-layer message sequences. In one example, a method for detecting obscure cyclic application-layer message sequences in transport-layer message sequences may include (i) collecting a composite sequence of transport-layer messages that are exchanged between a first computing device and a second computing device over a single long-standing transport-layer connection, (ii) constructing a sequence graph from the composite sequence, (iii) traversing the sequence graph to discover a first obscure cyclic sequence of application-layer messages in the composite sequence, and (iv) performing a security action using a representation of the first obscure cyclic sequence. In some examples, the composite sequence may include the first obscure cyclic sequence and a second obscure cyclic sequence of application-layer messages that were exchanged by the first computing device and the second computing device, and each message in the composite sequence may include (i) a source identifier that identifies the source of the message, (ii) a destination identifier that identifies the destination of the message, and (iii) a distinguishing feature that distinguishes the message from at least one other message in the composite sequence that is from the same source to the same destination.

In some examples, the step of constructing the sequence graph from the composite sequence may include (i) generating, for each message in the composite sequence, a tuple from the distinguishing feature of the message, the source identifier of the message, and/or the destination identifier of the message, (ii) adding, for each unique tuple that is generated, a node to the sequence graph to represent messages in the composite sequence whose tuple equals the unique tuple, and (iii) adding, for each sequence transition in the composite sequence from an immediately-preceding message to an immediately-succeeding message, an edge to the sequence graph to represent the sequence transition and connect the node that represents the tuple of the sequence transition's immediately-preceding message to the node that represents the tuple of the sequence transition's immediately-succeeding message. In at least one example, the first computing device may include a supervisory station of an industrial control system, the second computing device may include an industrial device of the industrial control system, the source identifier and the destination identifier of each message in the composite sequence may be a transport-layer identifier, and/or the distinguishing feature of each message in the composite sequence may include a length of an application-layer payload of the message. In some examples, the step of traversing the sequence graph to discover the first obscure cyclic sequence may include traversing the sequence graph to discover each instance of the first obscure cyclic sequence in the composite sequence.

In some examples, the step of collecting the composite sequence may include (i) logging the distinguishing feature of each message in the composite sequence, (ii) logging an order in which each message in the composite sequence was observed, and (iii) logging a time at which each message in the composite sequence was observed. In at least one example, the step of constructing the sequence graph may further include (i) analyzing times at which messages in the composite sequence were observed, (ii) discovering, based at least in part on analyzing the times, a tuple of the first message in the first obscure cyclic sequence, and (iii)

discovering, based at least in part on analyzing the times, a tuple of the last message in the first obscure cyclic sequence. In this example, the step of traversing the sequence graph to discover the first obscure cyclic sequence may include traversing the sequence graph from a representation of the first message to a representation of the last message to discover a tuple of an intermediate message of the first obscure cyclic sequence.

In some examples, the step of constructing the sequence graph may further include creating, for each node in the sequence graph, a dictionary of sequence transitions and adding, for each sequence transition in the composite sequence whose preceding message's tuple is equal to the tuple that is represented by the node, an entry to the dictionary to represent the sequence transition. In this example, the entry may include (i) a succeeding-message tuple that is equal to the tuple of the sequence transition's succeeding message, (ii) a transition order that is equal to the order of the sequence transition in the composite sequence, and (iii) a time interval equal to the amount of time between observances of the sequence transition's preceding message and the sequence transition's succeeding message. In one example the edge that connects the nodes that represent the tuples of the sequence transition's preceding and succeeding messages may include a directed edge that is incident from the node that represents the tuple of the sequence transition's preceding message and incident to the node that represents the tuple of the sequence transition's succeeding message.

In some examples, the step of traversing the sequence graph from the representation of the first message to the representation of the last message may include determining a tuple of the second message in the first obscure cyclic sequence by (i) visiting a node in the sequence graph, (ii) locating an entry in the node's dictionary whose succeeding-message tuple is equal to the tuple of the first message, (iii) traversing the sequence graph along a directed edge incident from the node and incident to an adjacent node, (iv) locating an adjacent entry in the adjacent node's dictionary whose transition order is one more than the transition order of the entry, and (v) determining, based at least in part on locating the adjacent entry in the adjacent node's dictionary, that the tuple of the second message is the same as the succeeding-message tuple of the adjacent entry. In this example, the representation of the first message may include the entry.

In some examples, traversing the sequence graph from the representation of the first message to the representation of the last message may further include determining a tuple of the second-to-last message in the first obscure cyclic sequence by (i) visiting, after traversing the sequence graph along the directed edge incident from the node and incident to the adjacent node, an additional node in the sequence graph, (ii) locating an additional entry in the additional node's dictionary whose succeeding-message tuple is equal to the tuple of the last message, and (iii) determining, based at least in part on locating the additional entry, that the tuple of the second-to-last message is equal to the tuple represented by the additional node. In this example, the representation of the last message may include the additional entry.

In some examples, the step of analyzing the times may include (i) identifying a plurality of messages in the composite sequence whose tuples match and (ii) identifying, for each message in the plurality of messages, a time interval that is equal to the amount of time between observances of the message and an immediately preceding message in the composite sequence. In one example, the step of discovering the tuple of the first message may include (i) determining that a variation in the time intervals of the plurality of messages is greater than a predetermined threshold and (ii) determining, based at least in part on the variation being greater than the predetermined threshold, that the tuple of the first message is the same as the tuples of the plurality of messages. In some examples, the step of discovering the tuple of the first message may include (i) determining that an average of the time intervals of the plurality of messages is greater than a predetermined threshold and (ii) determining, based at least in part on the average being greater than the predetermined threshold, that the tuple of the first message is the same as the tuples of the plurality of messages.

In some examples, the step of analyzing the times may include (i) identifying a plurality of messages in the composite sequence whose tuples match and (ii) identifying, for each message in the plurality of messages, a time interval that is equal to the amount of time between observances of the message and an immediately succeeding message in the composite sequence. In some examples, the step of discovering the tuple of the last message may include (i) determining that a variation in the time intervals of the plurality of messages is greater than a predetermined threshold and (ii) determining, based at least in part on the variation being greater than the predetermined threshold, that the tuple of the last message is the same as the tuples of the plurality of messages. In other examples, the step of discovering the tuple of the last message may include (i) determining that an average of the time intervals of the plurality of messages is greater than a predetermined threshold and (ii) determining, based at least in part on the average being greater than the predetermined threshold, that the tuple of the last message is the same as the tuples of the plurality of messages.

In some examples, the step of performing the security action may include monitoring an additional composite sequence of transport-layer messages that are exchanged between the first computing device and the second computing device and using the representation of the first obscure cyclic sequence to detect an anomaly in the additional composite sequence. In other examples, the step of performing the security action may include (i) compiling a dataset that may include at least each instance of the first obscure cyclic sequence in the composite sequence and (ii) performing deep packet inspection on the dataset to discover a common field, a random field, and/or a discrete field of an application-layer message in the first obscure cyclic sequence.

In one embodiment, a system for detecting obscure cyclic application-layer message sequences in transport-layer message sequences may include several modules stored in memory, including (i) a collecting module that collects a composite sequence of transport-layer messages that are exchanged between a first computing device and a second computing device over a single long-standing transport-layer connection, (ii) a constructing module that constructs a sequence graph from the composite sequence, (iii) a traversing module that traverses the sequence graph to discover a first obscure cyclic sequence of application-layer messages in the composite sequence, and (iv) a security module that performs a security action using a representation of the first obscure cyclic sequence. In some examples, the system may also include at least one physical processor that executes the collecting module, the constructing module, the traversing module, and the security module. In some examples, the composite sequence may include the first obscure cyclic sequence and a second obscure cyclic sequence of application-layer messages that were exchanged by the first computing device and the second computing device, and each message in the composite sequence may include (i) a source identifier that identifies the source of the message, (ii) a destination identifier that identifies the destination of the message, and (iii) a distinguishing feature that distinguishes the message from at least one other message in the composite sequence that is from the same source to the same destination.

In some examples, the constructing module may construct the sequence graph from the composite sequence by (i) generating, for each message in the composite sequence, a tuple from the distinguishing feature of the message, the source identifier of the message, and/or the destination identifier of the message, (ii) adding, for each unique tuple that is generated, a node to the sequence graph to represent messages in the composite sequence whose tuple equals the unique tuple, and (iii) adding, for each sequence transition in the composite sequence from an immediately-preceding message to an immediately-succeeding message, an edge to the sequence graph to represent the sequence transition and connect the node that represents the tuple of the sequence transition's immediately-preceding message to the node that represents the tuple of the sequence transition's immediately-succeeding message.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) collect a composite sequence of transport-layer messages that are exchanged between a first computing device and a second computing device over a single long-standing transport-layer connection, (ii) construct a sequence graph from the composite sequence, (iii) traverse the sequence graph to discover a first obscure cyclic sequence of application-layer messages in the composite sequence, and (iv) perform a security action using a representation of the first obscure cyclic sequence.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
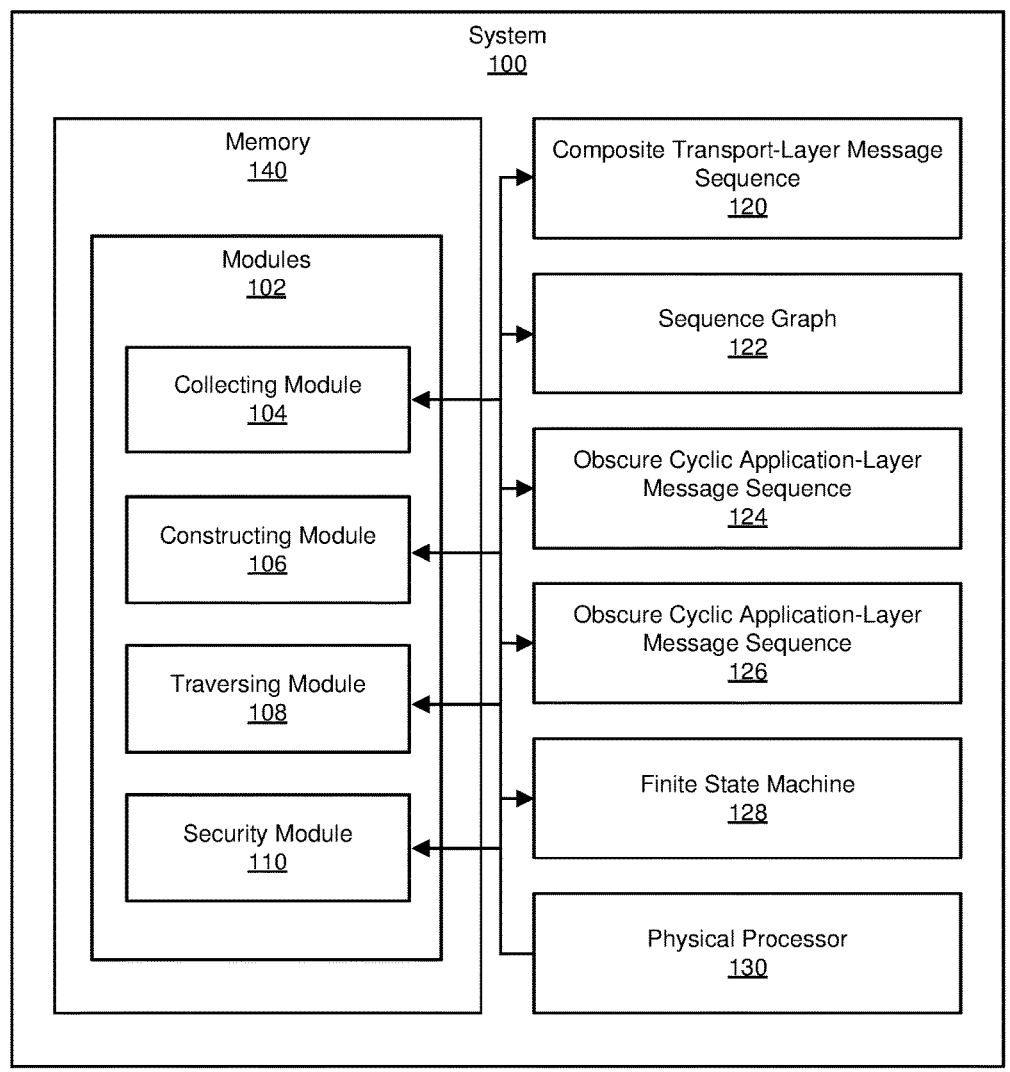
FIG. 1 is a block diagram of an example system for detecting obscure cyclic application-layer message sequences in transport-layer message sequences.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting obscure cyclic application-layer message sequences in transport-layer message sequences. As will be explained in greater detail below, by traversing a sequence graph that was created from a composite sequence of transport-layer messages that contains a number of obscure cyclic sequences of application-layer messages (e.g., a number of distinct conversations between two hosts on a network), the systems and methods described herein may enable application-protocol agnostic discovery of each and every one of the obscure cyclic sequences of application-layer messages. Furthermore, in some examples, by discovering obscure cyclic sequences of application-layer messages, these systems and methods may enable the detection of anomalous application-layer messages within ICS networks that use application-layer protocols that are proprietary, hidden, undocumented, and/or not available to the public.

In addition, the systems and methods described herein may improve the functioning of a computing device by detecting potentially malicious network traffic with increased accuracy and thus reducing the computing device's likelihood of infection. These systems and methods may also improve the field of anomaly detection and/or ICS security by enabling the baselining of ICS network traffic and the detection of anomalies within the same. Embodiments of the instant disclosure may also provide various other advantages and features, as discussed in greater detail below.

Figure 2:
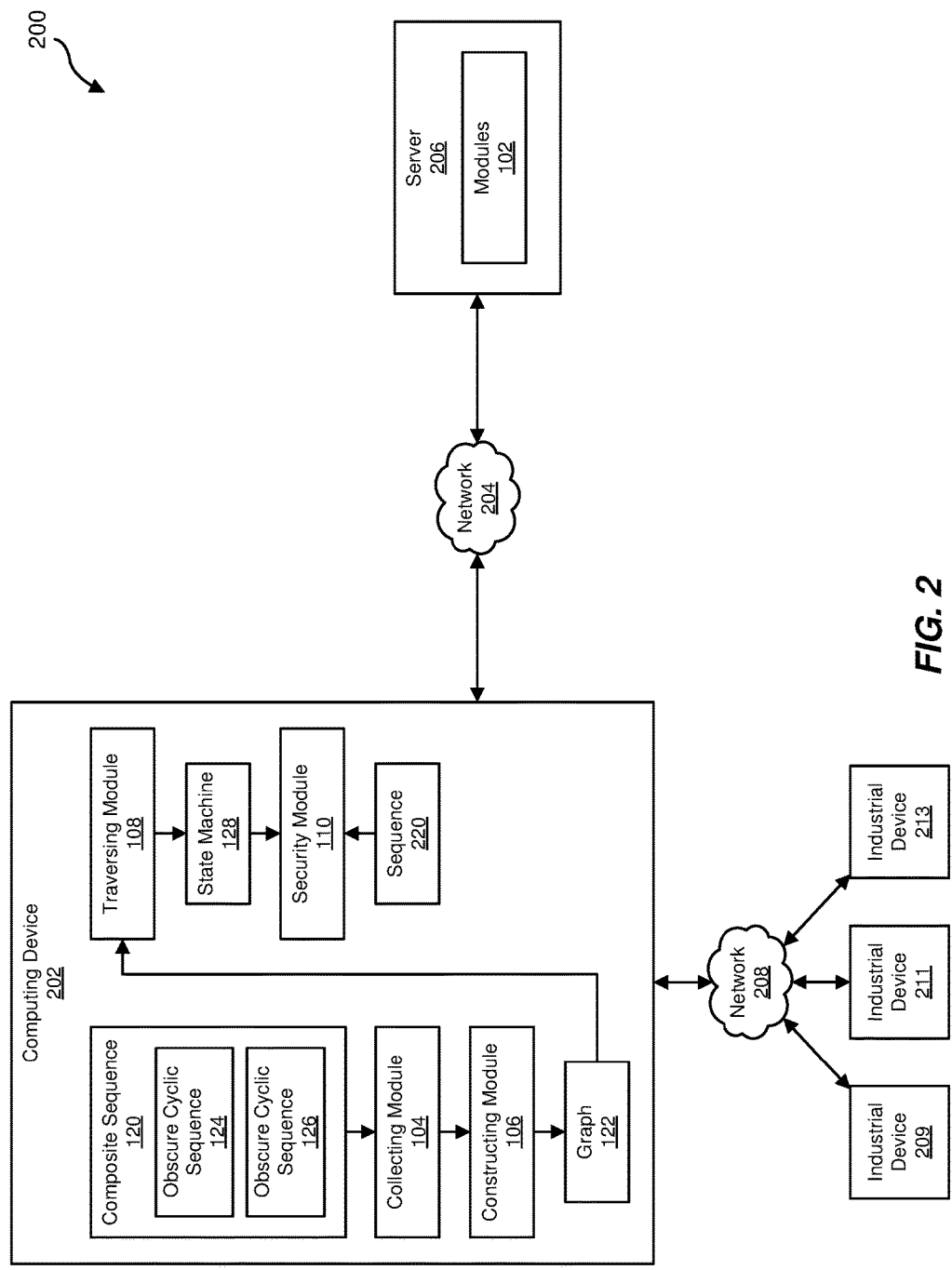
FIG. 2 is a block diagram of an additional example system for detecting obscure cyclic application-layer message sequences in transport-layer message sequences.

The following will provide, with reference to FIGS. 1-2, detailed descriptions of example systems for detecting obscure cyclic application-layer message sequences in transport-layer message sequences. Detailed descriptions of corresponding computer-implemented methods will also be provided in connection with FIGS. 3-8. In addition, detailed descriptions of an exemplary computing system and network architecture capable of implementing one or more of the embodiments described herein will be provided in connection with FIGS. 9 and 10, respectively.

FIG. 1 is a block diagram of an example system 100 for detecting obscure cyclic application-layer message sequences in transport-layer message sequences. As illustrated in this figure, example system 100 may include one or more modules 102 for performing one or more tasks. As will be explained in greater detail below, modules 102 may include a collecting module 104, a constructing module 106, a traversing module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting obscure cyclic application-layer message sequences in transport-layer message sequences. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 5:
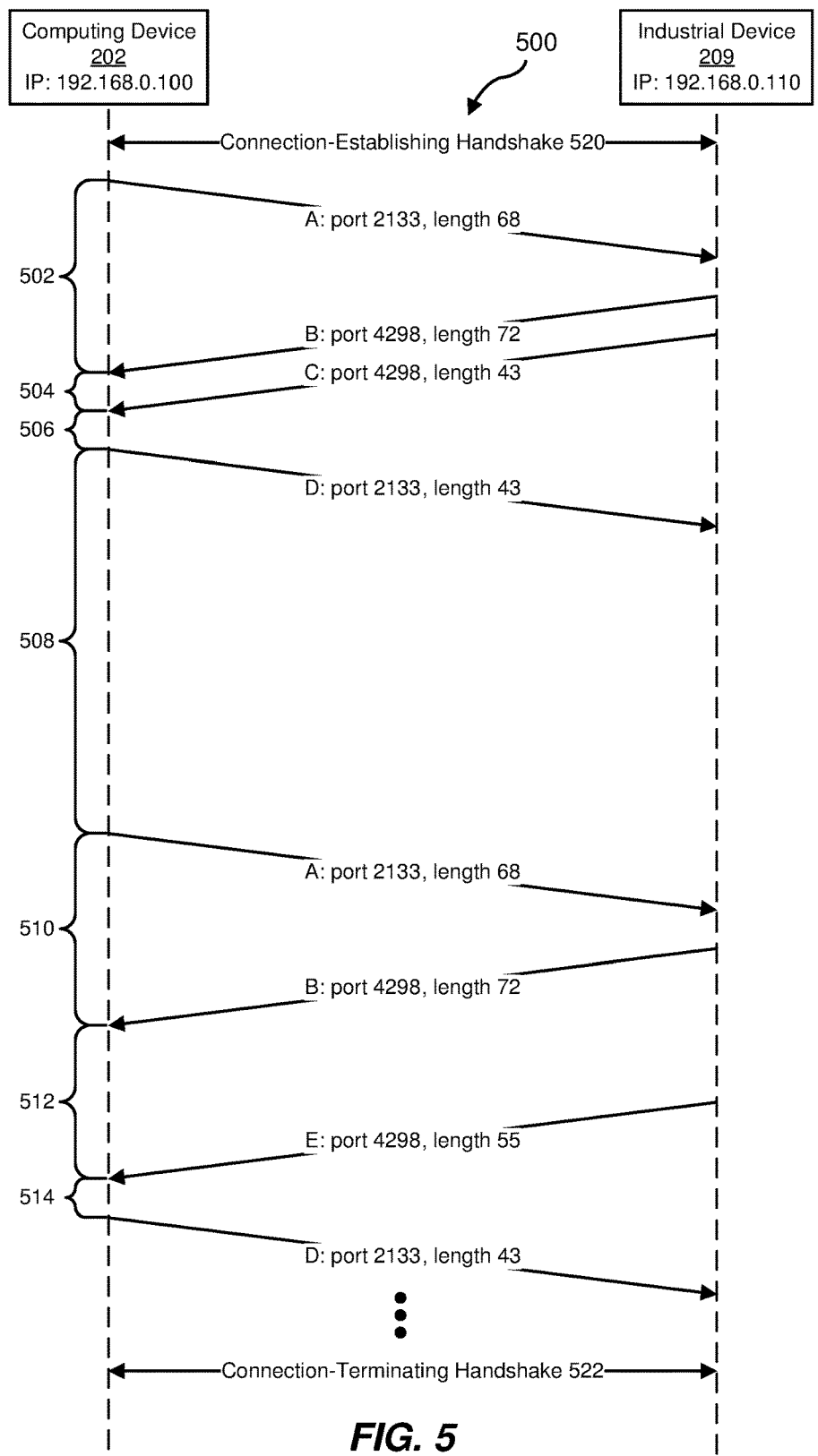
FIG. 5 is a timing diagram of an exemplary exchange of transport-layer messages over a single long-standing transport-layer connection.

As illustrated in FIG. 1, example system 100 may also include one or more composite sequences of transport-layer messages (such as composite transport-layer message sequence 120), one or more sequence graphs (such as sequence graph 122), one or more obscure cyclic sequences of application-layer messages (such as obscure cyclic application-layer message sequences 124 and 126), and/or one or more representations of obscure cyclic sequences of application-layer messages (such as finite state machine 128). Composite transport-layer message sequence 120 generally represents any type or form of transport-layer message sequence that has been exchanged between two computing devices over a single transport-layer connection. In one example, transport-layer message sequence 120 may represent a sequence of TCP packets that have been exchanged between two computing devices over an IP network. As used herein, the term "transport-layer message" generally refers to any unit of data of a transport-layer protocol, and the term "transport-layer protocol" generally refers to any protocol implemented at the transport layer of the TCP/IP model. The term "single long-standing transport-layer connection," as used herein, generally refers to any connection made between two computing devices at the transport layer of the TCP/IP model that is established and/or terminated by the exchange of handshaking messages (such as SYN, SYN-ACK, FIN, or FIN-ACK messages). FIG. 5 illustrates an exemplary long-standing transport-layer connection. In this example, a long-standing transport-layer connection may be established between computing device 202 and industrial device 209 by performing connection-establishing handshake 520 and may be later terminated by performing connection-terminating handshake 522.

Figure 4:
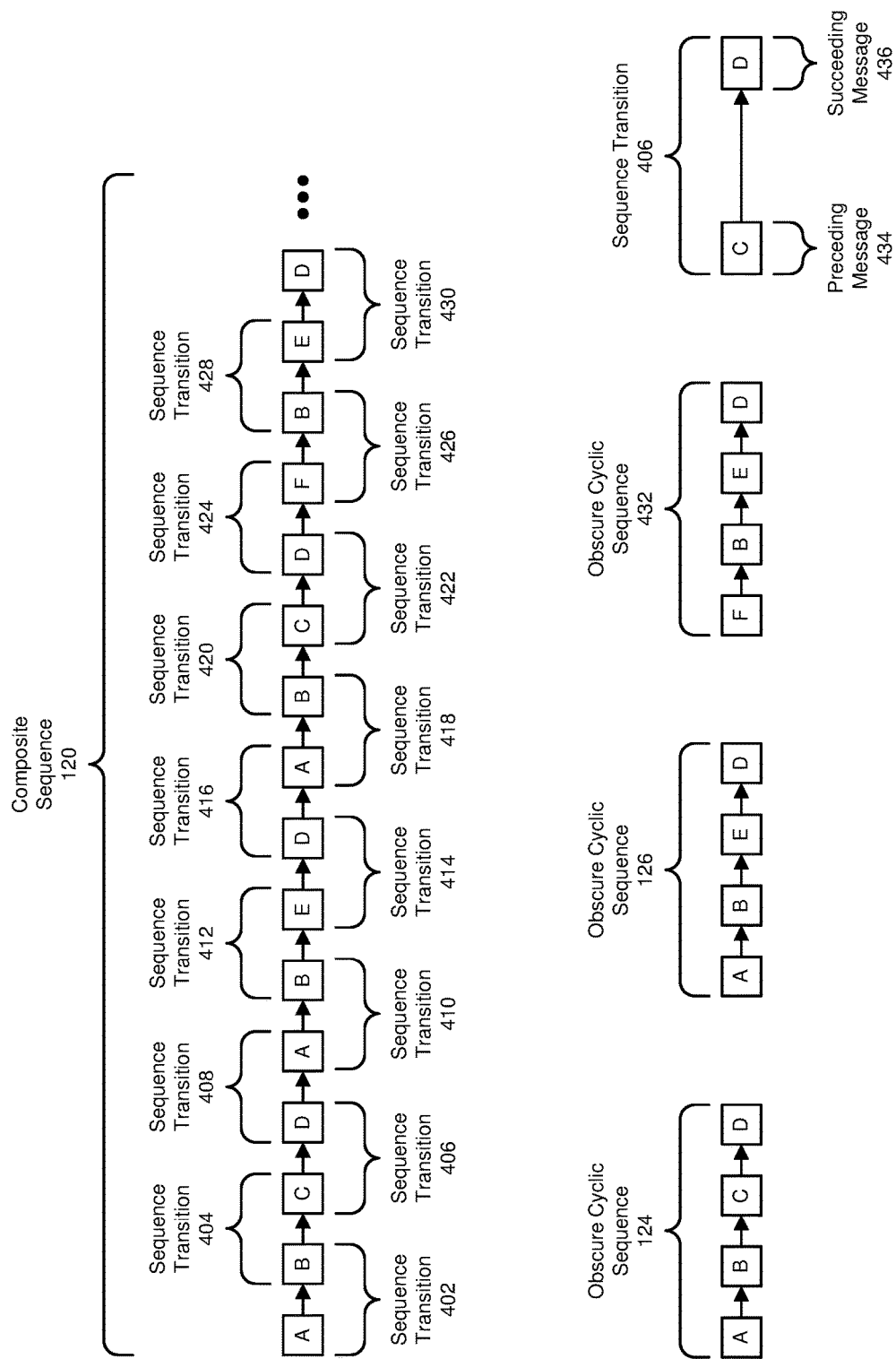
FIG. 4 is a block diagram of an exemplary composite sequence of transport-layer messages.

The systems described herein may observe various sequences of transport-layer messages. As used herein, the term "composite sequence of transport-layer messages" generally refers to any serial data stream that has been exchanged between two computing devices over a single transport-layer connection and that contains or carries two or more sequences of application-layer messages. An example of a composite sequence of transport-layer messages is shown in FIG. 4. In this example, composite sequence 120 may include the messages (broadcast in the order shown) A, B, C, D, A, B, E, D, A, B, C, D, F, B, E, and D. In this figure, "A" may represent a generated tuple of the first message in composite sequence 120, "B" may represent a generated tuple of the succeeding message, etc. Messages in an observed composite sequence may transition from one to another such that one message is preceded and succeeded by other messages. As used herein, the term "sequence transition" generally refers to any direct or immediate transition from one message (a preceding message) to another message (a succeeding message). Sequence transition 406 in FIG. 4 provides an example of a sequence transition within composite sequence 120. In this example, sequence transition 406 includes a preceding message 434 (a C message) and a succeeding message 436 (a D message).

Obscure cyclic application-layer message sequences 124 and 126 generally represent any type or form of application-layer message sequence that has been exchanged between two computing devices. As used herein, the term "application-layer message" generally refers to any unit of data of an application-layer protocol, and the term "application-layer protocol" generally refers to any protocol implemented at the application layer of the TCP/IP model. In many cases, a sequence of application-layer messages may be made up of one or more recurring conversations (e.g., cyclic sequences of request-response messages).

As used herein, the term "cyclic sequence of application-layer messages" generally refers to any sequence of request and response messages that are exchanged between two computing devices and that occur again and again in the same order and/or at regular intervals. Examples of cyclic sequences of application-layer messages are shown in FIG. 4. In these examples, obscure cyclic sequence 124, obscure cyclic sequence 126, and obscure cyclic sequence 432 may represent recurring distinct conversations between computing device 202 and industrial device 209 in FIG. 2. As shown, obscure cyclic sequence 124 may include the messages (in order) A, B, C, and D; obscure cyclic sequence 126 may include the messages (in order) A, B, E, and D; and obscure cyclic sequence 432 may include the messages (in order) F, B, E, and D. In one example, obscure cyclic sequence 124 may represent a conversation between computing device 202 and industrial device 209 wherein computing device 202 requests the value of a sensor of industrial device 209 (e.g., a valve pressure) and industrial device 209 responds with the value. Similarly, obscure cyclic sequence 126 may represent another conversation between computing device 202 and industrial device 209 wherein computing device 202 requests the values of a set of sensors of industrial device 209 (e.g., all hydraulic temperatures) and industrial device 209 responds with the requested values. Finally, obscure cyclic sequence 432 may represent yet another distinct conversation between computing device 202 and industrial device 209 wherein computing device 202 requests that industrial device 209 perform a calibration function and industrial device 209 responds with an acknowledgment of a successful calibration.

In these examples (as shown in FIG. 5), an A message or an F message may be a request sent from computing device 202 to industrial device 209; a B message, a C message, or an E message may be a response to an A message or an F message; and a D message may be an acknowledgement sent from computing device 202 to industrial device 209. Because a B message, a C message, or an E message may be a response to an A message or an F message, the time period between any A message or F message and any succeeding B message, C message, or E message may be regular (i.e., industrial device 209 may respond with a B message at a regular interval after receiving an A message). Likewise, because a D message may be a response to a B message and a C message or a B message and an E message, the time period between any B message and C message and a succeeding D message may be regular; and the time period between any B message and E message and a succeeding D message may be regular.

Figure 6:
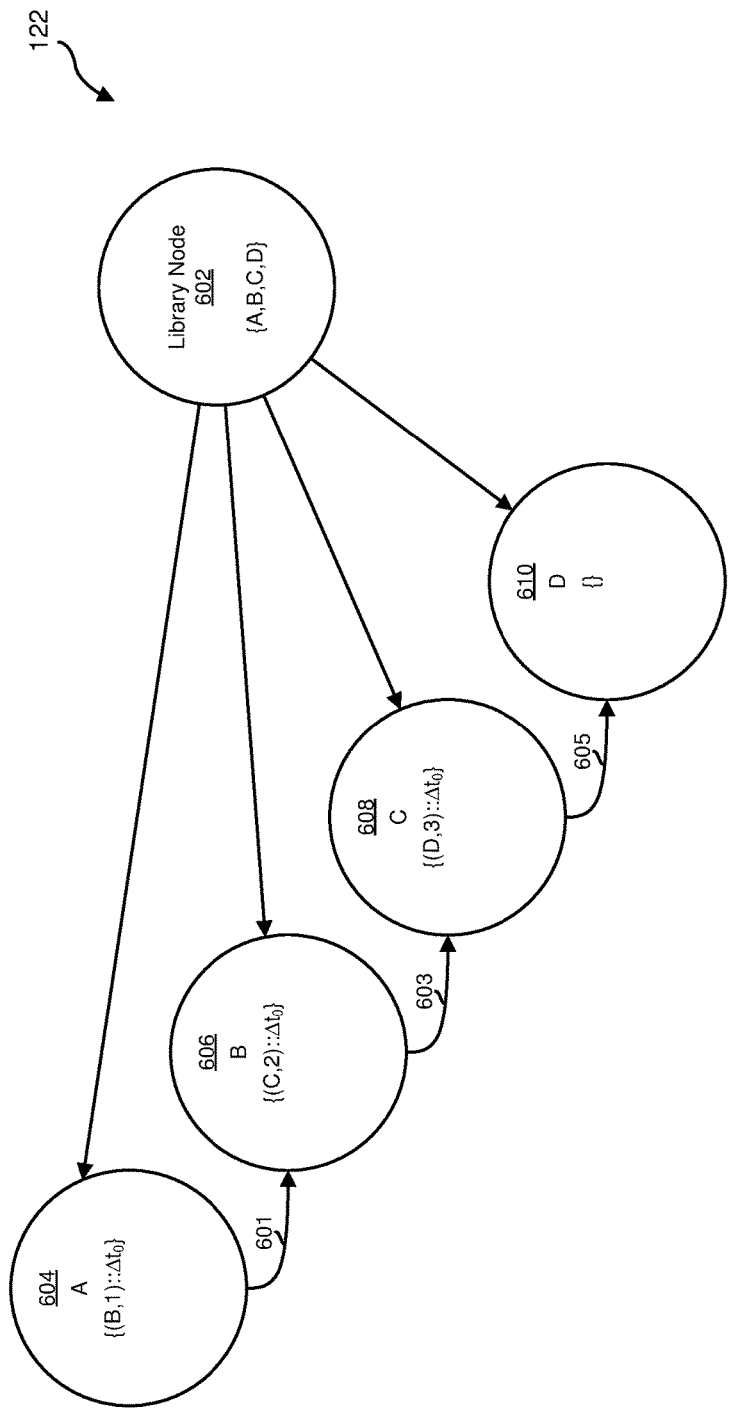
FIG. 6 is a block diagram of an exemplary sequence graph.

Sequence graph 122 generally represents any type or form of logical, topological, and/or graphical representation of a sequence of messages that is based on how the messages transitioned one from another. As will be described in greater detail below, the systems and methods described herein may build sequence graphs from information about one or more sequence transitions that occurred within a sequence of messages and may include representations (e.g., nodes) of the unique message tuples in the sequence of messages that are connected by representations (e.g., edges, such as directed edges) of the sequence transitions in the sequence of messages. An example, of sequence graph 122 is illustrated in FIG. 6.

Figure 8:
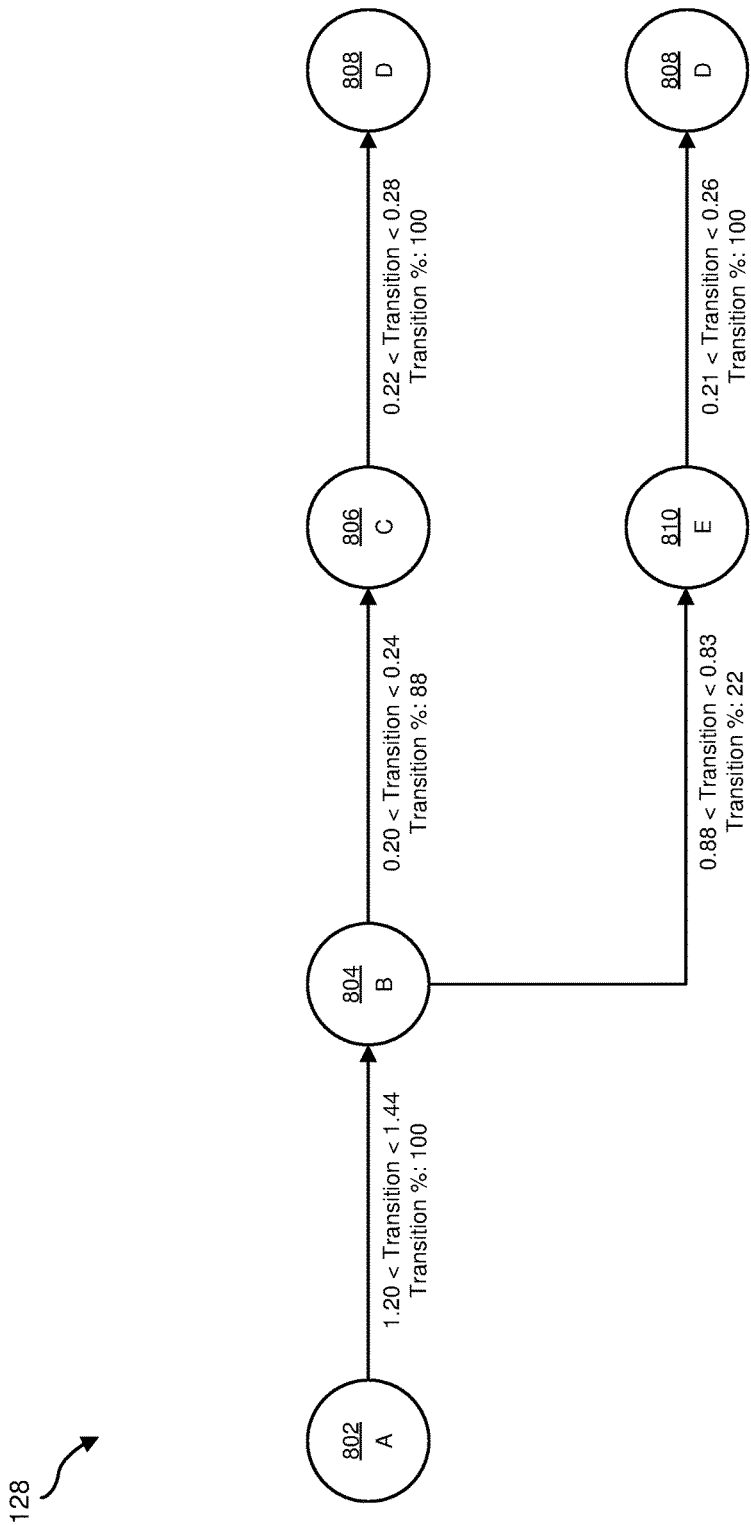
FIG. 8 is a block diagram of an exemplary state machine.

Finite state machine 128 generally represents any type or form of mathematical model of states and transitions that can only be in a single state at a time and that may represent the likelihood or conditions of transitioning from one state to another. In some examples, the states of a finite state machine may represent the message types found in a cyclic sequence of messages, and the transitions of the finite state machine may represent the normal conditions under which one type of message is followed by another type of message. In one example, finite state machine 128 may represent a Markov chain that represents one or more cyclic message sequences. An example of finite state machine 128 is illustrated in FIG. 8.

Example system 100 in FIG. 1 may be implemented in a variety of ways. For example, all or a portion of example system 100 may represent portions of example system 200 in FIG. 2. As shown in FIG. 2, system 200 may include a computing device 202 and a server 206 in communication via a network 204. System 200 may also include one or more industrial devices (such as industrial devices 209, 211, and 213) that are connected to computing device 202 via an ICS network 208. In this example, computing device 202 and industrial devices 209-213 may represent a portion of a ICS and be capable of transmitting and/or receiving application-layer messages via ICS network 208 using a transport-layer protocol. As used herein, the term "industrial control system" generally refers to any type or form of control system that is used in an industrial environment. Examples of industrial control systems include, without limitation, Process Control Systems (PCS), Distributed Control Systems (DCS), Supervisory Control And Data Acquisition (SCADA) Systems, and Safety Instrumented Systems (SIS).

Computing device 202 generally represents any type or form of computing device capable of reading computer-executable instructions. In one example, computing device 202 may represent a central supervisory station of an ICS that controls the other industrial devices in the ICS. Additional examples of computing device 202 include, without limitation, laptops, tablets, desktops, servers, network components (e.g., routers, switches, etc.), cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Industrial devices 209, 211, and 213 generally represent any type or form of ICS asset. Examples of industrial devices 209, 211, and 213 include, without limitation, sensors, actuators, motor drives, gauges, indicators and control-system components, such as Programmable Logic Controllers (PLCs), Master Terminal Units (MTUs), Remote Terminal Units (RTUs), Intelligent Electronic Devices (IEDs), Human-Machine Interfaces (HMIs), engineering workstations, application servers, data historians, and Input/Output (10) servers.

Server 206 generally represents any type or form of computing device that is capable of reading computer-executable instructions. Examples of server 206 include, without limitation, application servers and database servers configured to provide various database services and/or run certain software applications. In at least one example, server 206 may represent a cloud-based service for detecting obscure cyclic application-layer message sequences in transport-layer message sequences. In such an example, server 206 may detect obscure cyclic application-layer message sequences in transport-layer message sequences for many different ICSs.

Network 204 and network 208 generally represent any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a Wi-Fi network or communication channel, a Bluetooth network or communication channel, a Near Field Communication (NFC) network or communication channel, or the like. Network 204 and/or network 208 may facilitate communication or data transfer using wireless or wired connections. In one embodiment, network 204 may facilitate communication between computing device 202 and/or server 206; and network 208 may facilitate communication between computing device 202, industrial device 209, industrial device 211, and/or industrial device 213.

Figure 3:
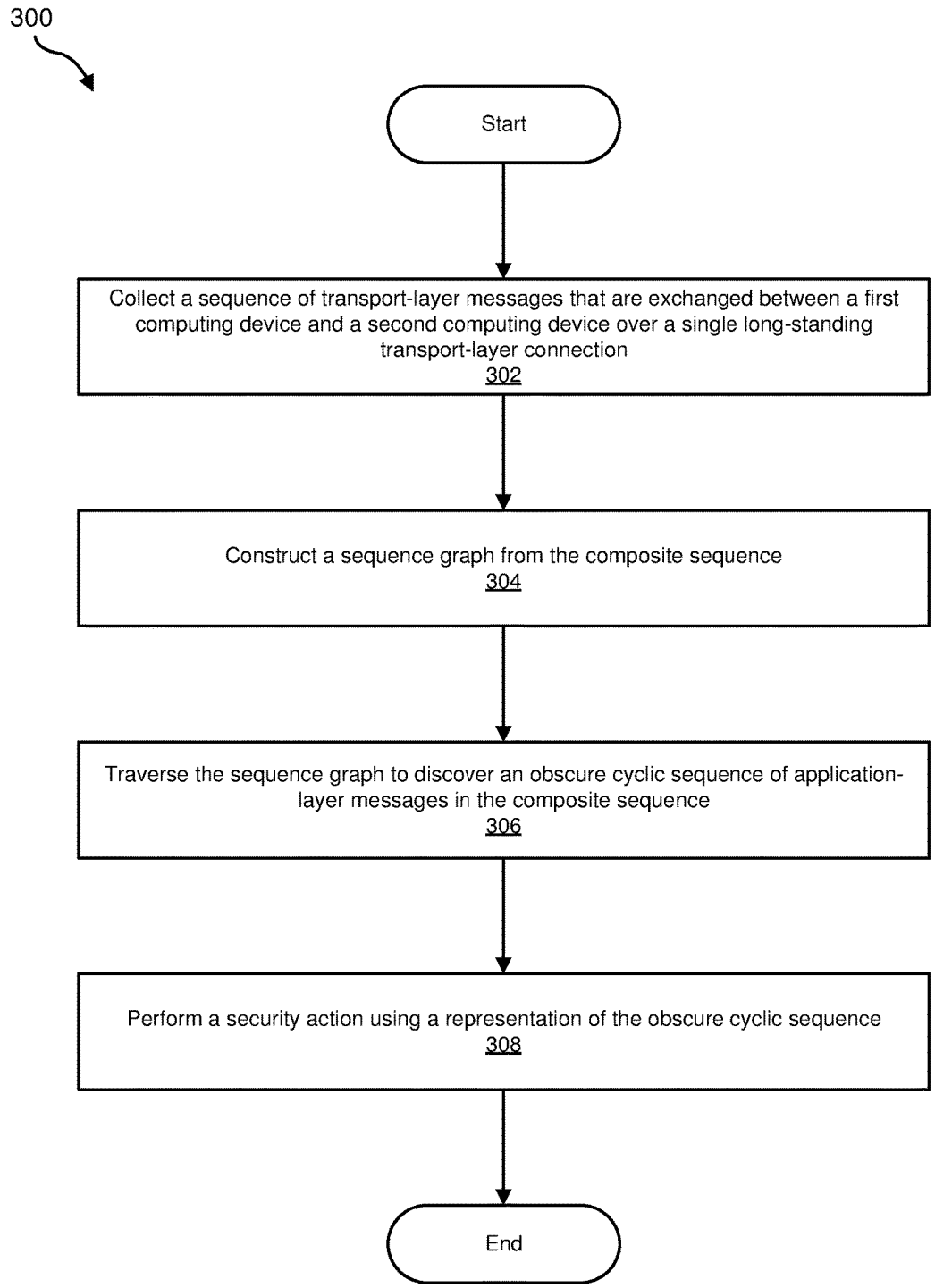
FIG. 3 is a flow diagram of an example method for detecting obscure cyclic application-layer message sequences in transport-layer message sequences.

FIG. 3 is a flow diagram of an example computer-implemented method 300 for detecting obscure cyclic application-layer message sequences in transport-layer message sequences. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may collect a composite sequence of transport-layer messages that are exchanged between a first computing device and a second computing device over a single long-standing transport-layer connection. For example, collecting module 104 may, as part of computing device 202 in FIG. 2, collect composite sequence 120.

Collecting module 104 may collect a sequence of transport-layer messages in a variety of ways. In one example, collecting module 104 may collect a sequence of transport-layer messages by logging, as part of any component of an ICS and/or a special logging device that is connected to the network of the ICS, the transport-layer messages as they are transmitted between any two components of the ICS. Using FIG. 2 as an example, collecting module 104 may, as part of computing device 202, log composite sequence 120 as its messages are exchanged between computing device 202 and industrial device 209.

Additionally or alternatively, collecting module 104 may collect a sequence of transport-layer messages that were exchanged between two components of an ICS by receiving the sequence of transport-layer messages from a device that is connected to the network of the ICS and that logged the sequence of transport-layer messages when they were broadcast over the network. In general, as part of collecting a sequence of transport-layer messages, collecting module 104 may (i) log a distinguishing feature (e.g., a source IP address, a source port address, and/or a length) of each message in the sequence of transport-layer messages, (ii) log the order in which each message in the sequence of transport-layer messages was observed, (iii) and log the time (an absolute or relative time) at which each message in the sequence of transport-layer messages was observed (e.g., time deltas 502-514 in FIG. 5).

At step 304, one or more of the systems described herein may construct a sequence graph from the composite sequence. For example, constructing module 106 may, as part of computing device 202 in FIG. 2, construct sequence graph 122 from composite sequence 120.

The systems described herein may perform step 304 in any suitable manner. In general, constructing module 106 may construct a sequence graph from a sequence of messages by first generating, for each message in the sequence, a tuple from any combination of distinguishing features (such as a length of the message, a length of a data field of the message, or a value of a low-entropy portion of the data field, and/or any known opcodes contained in the data field), source identifiers (such as a source port or source IP address), and/or destination identifiers (such as a source port or source IP address) of the message. Using FIGS. 4 and 5 as an example, constructing module 106 may generate a tuple for the first message in composite sequence 120 from the source IP address (i.e., "192.168.0.100"), the source port (i.e., "2133"), and the length of the first message (i.e., "68") that is equal to the ordered list "(192.168.0.100, 2133, 68)."

After generating a tuple for each message in a sequence of messages, constructing module 106 may continue to construct the sequence graph by (i) adding, for each unique message tuple in the sequence, a node to the sequence graph to represent the unique message tuple and (ii) adding, for each unique sequence transition in the sequence of messages from an immediately-preceding message to an immediately-succeeding message, an edge to the sequence graph to represent the unique sequence transition and to connect the node that represents the tuple of the unique sequence transition's immediately-preceding message to the node that represents the tuple of the unique sequence transition's immediately-succeeding message. In some examples, constructing module 106 may connect nodes in a sequence graph using a directed edge that is incident from the node that represents the tuple of the sequence transition's preceding message and incident to the node that represents the tuple of the sequence transition's succeeding message. In some examples, constructing module 106 may use a librarian node (e.g., librarian node 602 in FIG. 6) to keep a record of all of the unique tuples that are represented in a sequence graph.

Figure 7:
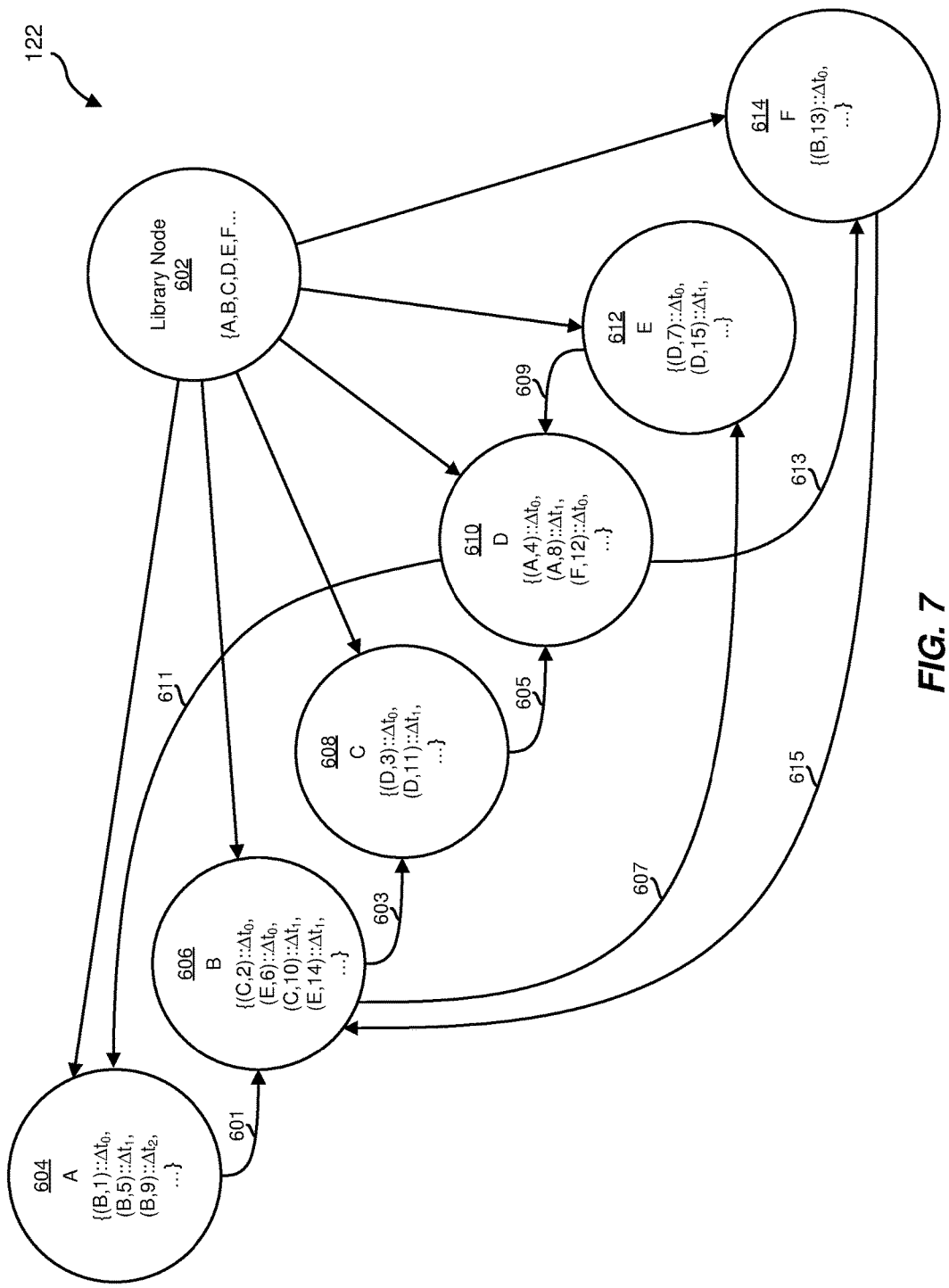
FIG. 7 is a block diagram of an exemplary sequence graph.

FIG. 6 illustrates sequence graph 122 in an initial state after constructing module 106 has processed composite sequence 120 up to and including the first instance of a D message. As shown, constructing module 106 has added nodes 604, 606, 608, and 610 to sequence graph 122 to represent messages with tuples A, B, C, and D, respectively. Constructing module 106 has also added edges 601, 603, and 605 to sequence graph 122 to represent sequence transition 402, sequence transition 404, and sequence transition 406, respectively. FIG. 7 illustrates sequence graph 122 in a second state after constructing module 106 has processed composite sequence 120 up to and including the fourth instance of a D message. As shown, constructing module 106 has added additional nodes and additional edges to sequence graph 122 to represent sequence transitions 408-430. For example, constructing module 106 has added additional nodes 612 and 614 to represent the remaining unique tuples (i.e., E and F) found in composite sequence 120 and additional edges 607-613 to sequence graph 122 to represent the remaining sequence transitions in composite sequence 120.

In addition to adding and connecting nodes, constructing module 106 may also create, for each node in a sequence graph, a dictionary of sequence transitions (e.g., a collection of key-value pairs) that represents all sequence transitions whose preceding message is represented by the node. For example, for each sequence transition in a sequence of messages, constructing module 106 may add an entry that represents the sequence transition into the dictionary of the node that represents the sequence transition's preceding message. In some examples, the entry may include (i) a succeeding-message tuple that is equal to the tuple of the sequence transition's succeeding message, (ii) a transition order that is equal to the order of the sequence transition in the sequence of messages, and (iii) a time interval equal to the amount of time between observances of the sequence transition's preceding message and the sequence transition's succeeding message. In at least one example, each entry may be in the form of key::value, where the key is an additional tuple whose elements are the entry's succeeding-message tuple and transition order and the value is the entry's time interval. Using FIG. 6 as an example, the entry $(B,1)::\Delta t_0$ in the dictionary of node 604 may represent sequence transition 402 whose succeeding-message tuple is "A," whose transition order is "1," and whose time interval is equal to a particular value represented by "$\Delta t_0$."

As illustrated in FIG. 7, after constructing module 106 has processed composite sequence 120 up to and including the first instance of a D message, constructing module 106 may have added the entry $(B,1)::\Delta t_0$ to the dictionary of node 604 to represent the sequence transition 402 of composite sequence 120, the entry $(C,2)::\Delta t_0$ to the dictionary of node 606 to represent sequence transition 404, and the entry $(D,3)::\Delta t_0$ to the dictionary of node 608 to represent sequence transition 406. As illustrated in FIG. 7, after constructing module 106 has processed composite sequence 120 up to and including the fourth instance of a D message, constructing module 106 may have added additional entries to the dictionaries in sequence graph 122 to represent sequence transitions 608-630. For example, constructing module 106 may have added the entry $(A,4)::\Delta t_0$, the entry $(A,8)::\Delta t_1$, and the entry $(F,12)::\Delta t_0$ to the dictionary of node 610 to represent sequence transition 408, sequence transition 416, and sequence transition 424, respectively.

After or while constructing a sequence graph, the systems and methods disclosed herein may statistically analyze the times at which the messages in a composite sequence were observed in order to identify candidate starter and ender tuples. As used herein, the term "starter tuple" generally refers to a tuple of the messages in a composite sequence that are likely to start an obscure cyclic sequence that is contained in the composite sequence. Similarly, the term "ender tuple" generally refers to a tuple of the messages in a composite sequence that are likely to end an obscure cyclic sequence that is contained in the composite sequence. In many cases, the amounts of time between the messages in cyclic sequences of application-layer messages may be relatively short with a relatively low amount of variation when compared to the amounts of time between the cyclic sequences themselves. Using FIG. 4 as an example, the amounts of time between the messages in each of obscure cyclic sequences 124, 126, and 432 may be relatively short with a relatively low amount of variation when compared to the amounts of time between occurrences of obscure cyclic sequences 124, 126, and 432.

For at least the above-stated reason, constructing module 106 may identify candidate starter tuples by (i) identifying a group of messages in the composite sequence whose tuples match (e.g., all A messages), (ii) identifying, for each message in the group of messages, a preceding time interval that is equal to the amount of time between observances of the message and an immediately preceding message in the composite sequence, (iii) comparing an average or a variation of the preceding time intervals with those of other groups, and (iv) determining that the average and/or the variation of the preceding time intervals is greater than those of the other groups. In some examples, constructing module 106 may compare the averages and/or variations of the preceding time intervals of each group of messages whose tuples match in order to determine a threshold average or variation that may be used to distinguish groups of messages that are likely to start a cyclic application-layer message sequence from those that are not. Using FIG. 4 as an example, constructing module 106 may determine that A and F messages are likely to be the starting messages of any obscure cyclic message sequence found in composite sequence 120 by determining that the preceding time intervals of A and F messages are longer on average and/or vary to a greater degree as compared to the preceding time intervals of B, C, D, or E messages.

Likewise, constructing module 106 may identify candidate ender tuples by (i) identifying a group of messages in the composite sequence whose tuples match, (ii) identifying, for each message in the group of messages, a succeeding time interval that is equal to the amount of time between observances of the message and an immediately succeeding message in the composite sequence, (iii) comparing an average or a variation of the succeeding time intervals with those of other groups, and (iv) determining that the average and/or the variation of the succeeding time intervals is greater than those of the other groups. In some examples, constructing module 106 may compare the averages and/or variations of the succeeding time intervals of each group of messages whose tuples match in order to determine a threshold average or variation that may be used to distinguish groups of messages that are likely to end an obscure cyclic message sequence from those that are not. Using FIG. 4 as an example, constructing module 106 may determine that D messages are likely to be the ending messages of any obscure cyclic message sequence found in composite sequence 120 by determining that the succeeding time intervals of D messages are longer on average and/or vary to a greater degree as compared to the succeeding time intervals of A, B, C, E, or F messages.

The methods for constructing sequence graphs described herein are not intended to be exhaustive and the example sequence graphs are not intended to be limited to any precise form disclosed. Many modifications and variations are possible without departing from the spirit and scope of the instant disclosure. The embodiments disclosed herein should be considered in all respects illustrative and not restrictive.

At step 306, one or more of the systems described herein may traverse the sequence graph to discover an obscure cyclic sequence of application-layer messages in the composite sequence. For example, traversing module 108 may, as part of computing device 202 in FIG. 2, traverse sequence graph 122 to discover obscure cyclic sequences 124 and 126.

Traversing module 108 may traverse a sequence graph to discover an obscure cyclic sequence of application-layer messages in a variety of ways. In one example, traversing module 108 may traverse a sequence graph to identify obscure cyclic sequences by (i) iteratively visiting each node in the graph, (ii) determining, at each visited node, whether any of the entries within the node's dictionary has a succeeding-message tuple that matches one of the candidate starter tuples identified above, (iii) iteratively traversing the graph in sequence order from the node to other nodes in the graph until another node is visited that contains an entry whose succeeding-message tuple matches one of the candidate ender tuples identified above. By iteratively traversing the graph in sequence order from the node to other nodes in the graph until another node is visited that contains an entry whose succeeding-message tuple matches one of the candidate ender tuples identified above, traversing module 108 may identify each message that is contain in a single instance of an obscure cyclic sequence as well as each instance of the obscure cyclic sequence. Generally, traversing module 108 may select any node in a sequence graph as a starting point of graph traversal.

Using FIG. 7 as an example, traversing module 108 may discover the start of a first instance of cyclic sequence 126 by first visiting node 610 in sequence graph 122 and by identifying the entry $(A,4)::\Delta t_0$ within the dictionary of node 610 whose succeeding-message tuple (in this case "A") matches one of the candidate starter tuples identified above. Upon discovering the starting message of cyclic sequence 126, traversing module 108 may discover the next message (i.e., a B message) of cyclic sequence 126 by (i) traversing sequence graph 122 along the directed edges incident from node 610 (i.e., edges 613 and 611) and incident to the nodes adjacent to node 610 (i.e., nodes 604 and 614), (ii) locating an adjacent entry in an adjacent node's dictionary (i.e., the entry $(B,5)::\Delta t_0$ in the dictionary of node 604) whose transition order is one more than the transition order of the entry $(A,4)::\Delta t_0$, and (iii) determining, based on locating the adjacent entry in the adjacent node's dictionary, that the tuple of the second message is the same as the succeeding-message tuple of the adjacent entry (in this example "B").

Upon discovering the second message of cyclic sequence 126 and determining that the tuple of the second message does not match a candidate ender tuple, traversing module 108 may discover the next message (i.e., a C message) of cyclic sequence 126 by (i) traversing sequence graph 122 along the directed edge incident from node 604 (i.e., edge 601) and incident to a node adjacent to node 604 (i.e., node 606), (ii) locating an adjacent entry in the adjacent node's dictionary (i.e., the entry $(E,6)::\Delta t_0$ in the dictionary of node 606) whose transition order is one more than the transition order of the entry $(B,5)::\Delta t_0$, and (iii) determining, based on locating the adjacent entry in the adjacent node's dictionary, that the tuple of the next message in cyclic sequence 126 is equal to the succeeding-message tuple of the adjacent entry (in this example "C").

Upon discovering the third message of cyclic sequence 126 and determining that the tuple of the third message does not match a candidate ender tuple, traversing module 108 may continue to discover the next message (i.e., a D message) of cyclic sequence 126 by (i) traversing sequence graph 122 along the directed edges incident from node 606 (i.e., edges 603 and 607) and incident to nodes adjacent to node 606 (i.e., nodes 608 and 612). Traversing module 108 may then locate an adjacent entry in an adjacent node's dictionary (i.e., the entry $(D,7)::\Delta t_0$ in the dictionary of node 612) whose transition order is one more than the transition order of the entry $(E,6)::\Delta t_0$. Finally, traversing module 108 may determine that the tuple of the final message in cyclic sequence 126 is equal to the succeeding-message tuple of the adjacent entry (in this example "D") based on locating the adjacent entry in the adjacent node's dictionary and determining that the tuple of the final message matches a candidate ender tuple.

Upon discovering an obscure cyclic sequence as describe above, traversing module 108 may return to the starting node and repeat the above described process to discover and count every other instance of the obscure cyclic sequence that is represented in the sequence graph. In addition, upon using all the entries in a node's dictionary that contains a succeeding-message tuple that matches a starter tuple to discover obscure cyclic sequences, traversing module 108 may visit another node to continue the process of discovering obscure cyclic sequences.

In some examples, traversing module 108 may collapse, while processing each node in a sequence graph, the sequence graph to remove unneeded or redundant information. For example, after an entry in a node's dictionary has been used to traverse the graph, constructing module 106 may remove the entry from the node's dictionary. Additionally, after determining that each entry in a node's dictionary that has a particular succeeding-message tuple has been removed (i.e., the node's dictionary no longer contains any entry that represents a sequence transition from a preceding message whose tuple is represented by the node to a succeeding message whose tuple is represented by the succeeding-message tuple), constructing module 106 may remove the edge that represents sequence transitions from a preceding message whose tuple is represented by the node to a succeeding message whose tuple is represented by the succeeding-message tuple from the graph. Moreover, after determining that a node no longer has any edge incident from or to it, constructing module 106 may remove the node from the sequence graph.

Upon discovering one or more instances of an obscure cyclic sequence, traversing module 108 may store a representation of the obscure cyclic sequence. In at least one example, traversing module 108 may create a state machine to represent an obscure cyclic sequence by adding a representation of each of the obscure cyclic sequence's sequence transitions to the state machine. Traversing module 108 may add a representation of a sequence transition to a state machine by (i) adding, to the state machine, a first state to represent the tuple of the sequence transition's preceding message, (ii) adding, to the state machine, a second state to represent the tuple of the sequence transition's succeeding message, and (iii) adding, to the state machine, a transition from the first state to the second state.

Using FIG. 8 as an example, upon discovering cyclic sequences 124 and 126, traversing module 108 may store a representation of cyclic sequences 124 and 126 as exemplary state machine 128. In at least one example, traversing module 108 may create state machine 128 to represent obscure cyclic sequence 124 by adding a representation of the first, second, and third sequence transitions of obscure cyclic sequence 124 to state machine 128. As shown, traversing module 108 may add a representation of the first sequence transition of obscure cyclic sequence 124 to state machine 128 by (i) adding, to state machine 128, a state 802 to represent the tuple of the preceding message of the first sequence transition (i.e., "A"), (ii) adding, to state machine 128, a state 804 to represent the tuple of the succeeding message of the first sequence transition 638 (i.e., "B"), and (iii) adding, to state machine 128, a transition from state 802 to state 804. Similarly, traversing module 108 may add a representation of the second sequence transition of obscure cyclic sequence 124 to state machine 128 by (i) adding, to state machine 128, a state 806 to represent the tuple of the succeeding message of the second sequence transition (i.e., "C") and (ii) adding, to state machine 128, a transition from state 804 to state 806. Finally, traversing module 108 may add a representation of the third sequence transition of obscure cyclic sequence 124 to state machine 128 by (i) adding, to state machine 128, a state 808 to represent the tuple of the succeeding message of the third sequence transition (i.e., "D") and (ii) adding, to state machine 128, a transition from state 806 to state 808. As shown, traversing module 108 may store a representation of cyclic sequence 126 as part of exemplary state machine 128 in a similar manner. As shown, traversing module 108 may also add a guard condition to each of the state transitions in state machine 128 that indicates that each transition typically occurs within a specific amount of time and/or that indicates a probability that each transition will occur in a normal composite sequence of transport-layer messages.

As mentioned above, the methods for constructing sequence graphs described herein are not intended to be exhaustive and the example sequence graphs are not intended to be limited to any precise form disclosed. Many modifications and variations are possible without departing from the spirit and scope of the instant disclosure. As such, the methods for traversing the sequence graphs described herein are not intended to be exhaustive. The embodiments disclosed herein should be considered in all respects illustrative and not restrictive.

At step 308, one or more of the systems described herein may perform a security action using a representation of the first obscure cyclic sequence. For example, security module 110 may, as part of computing device 202 in FIG. 2, perform a security action using state machine 128.

The systems described herein may perform a variety of security actions using a representation of an obscure cyclic sequence of application-layer messages. In some examples, security module 110 may use a representation of an obscure cyclic sequence of application-layer messages as a baseline to which additional sequences of transport-layer messages may be compared and with which anomalies in the additional sequences of transport-layer messages may be detected. In some examples, security module 110 may use a state machine (such as finite state machine 128 in FIG. 8) that represents a cyclic sequence of application-layer messages to detect when a component involved in the cyclic sequence has malfunctioned or to detect a malicious attack that generates additional messages that are out of sync with the cyclic sequence. In response to detecting a malfunctioning component or a malicious attack, security module 110 may report the event to an interested party (e.g., an ICS technician, a security-service provider, etc.). Additionally or alternatively, security module 110 may perform a security action that prevents a malfunctioning component or a malicious attack from causing damage or harm.

In some examples, after each instance of an obscure cyclic sequence of application-layer messages has been identified in a composite sequence, security module 110 may (i) compile a dataset that may include each instance of the obscure cyclic sequence and (ii) perform deep packet inspection on similar messages (e.g., messages whose tuples match) in the dataset to discover and statistically analyze common fields (e.g., portions of the messages that are common), random fields (e.g., portions of the messages that fluctuate randomly), and discrete fields (e.g., portions of the messages that take on only a certain number of discrete values) in the cyclic sequence. In some examples, security module 110 may use the statistics obtained while performing deep packet inspection as baseline features to which additional sequences of transport-layer messages may be compared and with which anomalies in the additional sequences of transport-layer messages may be detected. Upon completion of step 308, exemplary method 300 in FIG. 3 may terminate.

As explained above, by traversing a sequence graph that was created from a composite sequence of transport-layer messages that contains an obscure cyclic sequence of application-layer messages, the systems and methods described herein may enable application-protocol agnostic discovery of the obscure cyclic sequence of application-layer messages. Furthermore, in some examples, by discovering obscure cyclic sequences of application-layer messages, these systems and methods may enable the detection of anomalous application-layer messages within ICS networks that use application-layer protocols that are proprietary, hidden, undocumented, and/or not available to the public.

Figure 9:
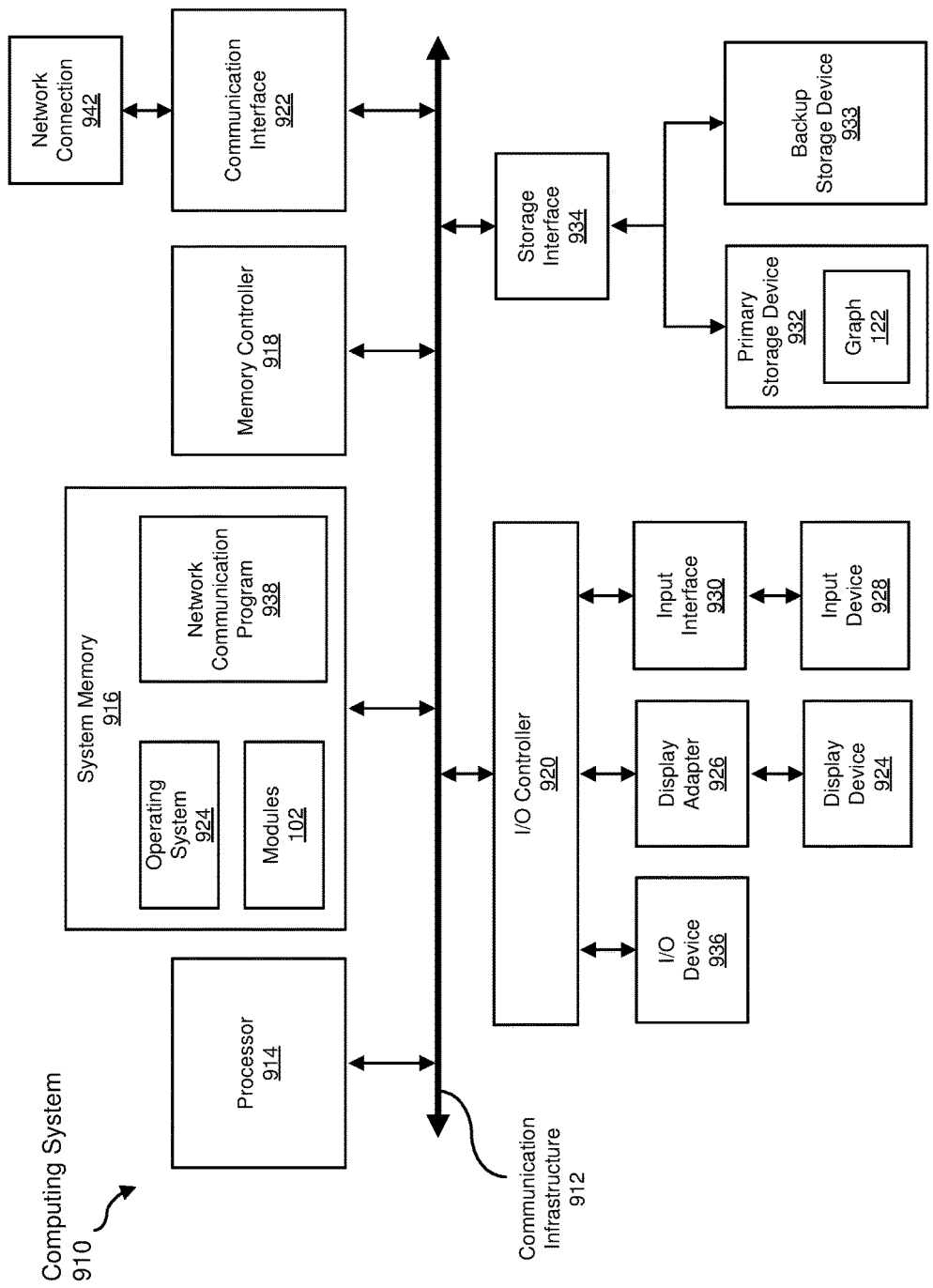
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In some examples, system memory 916 may store and/or load an operating system 924 for execution by processor 914. In one example, operating system 924 may include and/or represent software that manages computer hardware and software resources and/or provides common services to computer programs and/or applications on computing system 910. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to I/O controller 920 via an input interface 930. Input device 928 generally represents any type or form of input device capable of providing input, either computer or human generated, to example computing system 910. Examples of input device 928 include, without limitation, a keyboard, a pointing device, a speech recognition device, variations or combinations of one or more of the same, and/or any other input device.

Additionally or alternatively, example computing system 910 may include additional I/O devices. For example, example computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or Application Specific Integrated Circuit (ASIC) incorporated in communication interface 922.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, sequence graph 122 from FIG. 1 may be stored and/or loaded in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an Application Specific Integrated Circuit (ASIC) adapted to implement one or more of the example embodiments disclosed herein.

Figure 10:
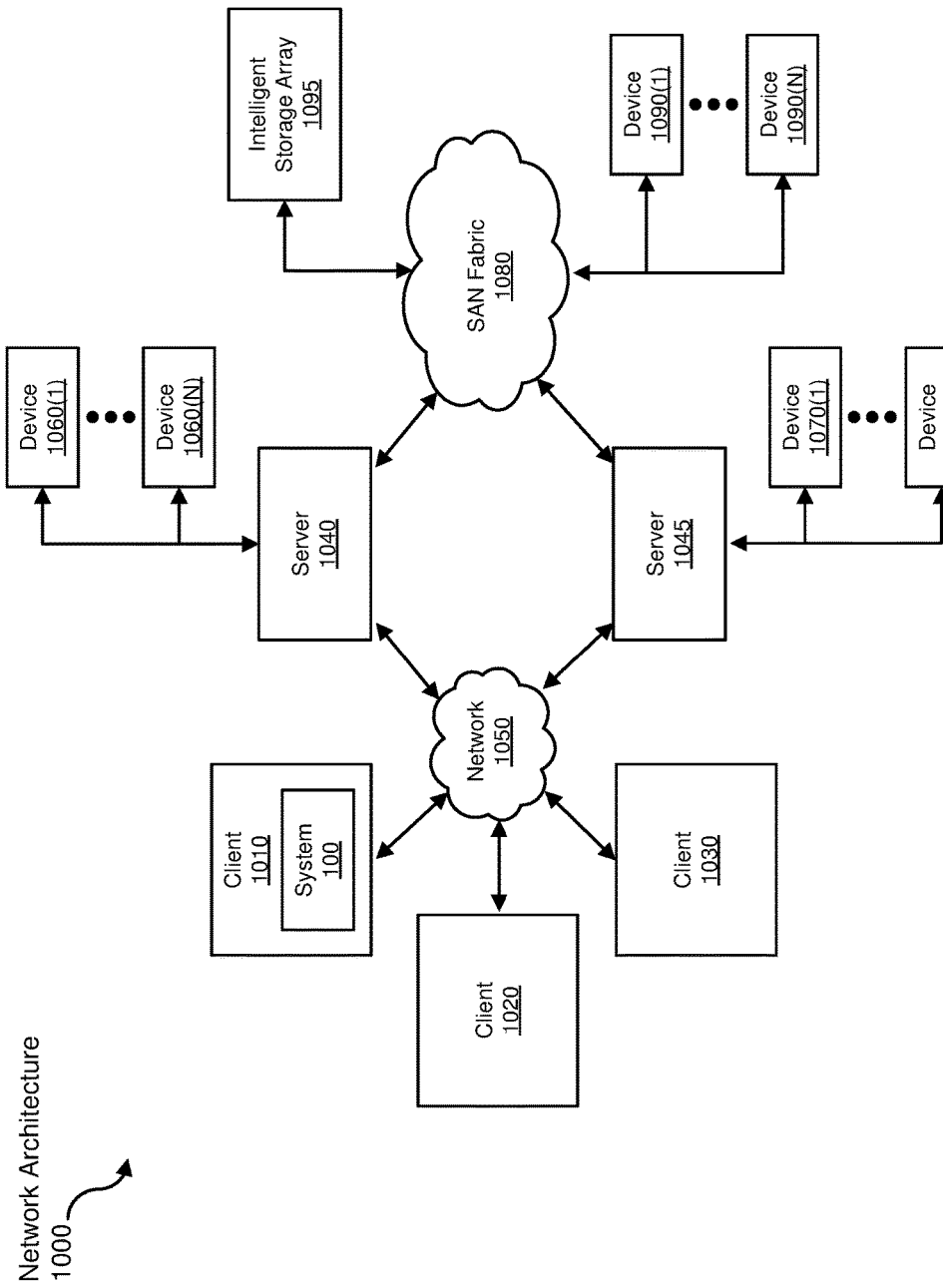
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for detecting obscure cyclic application-layer message sequences in transport-layer message sequences.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a composite sequence of transport-layer messages to be transformed, transform the composite sequence of messages into a sequence graph, output a result of the transformation to a system that traverses sequence graphs to detect obscure cyclic sequences of application-layer messages, use the result of the transformation to detect an obscure cyclic sequence of application-layer messages, and store the result of the transformation to a storage system that stores information about obscure cyclic sequences of application-layer messages. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting obscure cyclic application-layer message sequences in transport-layer message sequences, at least a portion of the method being performed by a computing device comprising at least one processor, the method comprising:
   collecting a composite sequence of transport-layer messages that are exchanged between a first computing device and a second computing device over a single long-standing transport-layer connection, wherein:
      the composite sequence comprises at least a first obscure cyclic sequence of application-layer messages and a second obscure cyclic sequence of application-layer messages that were exchanged by the first computing device and the second computing device; and
      each message in the composite sequence comprises:
         at least one source identifier that identifies the source of the message;
         at least one destination identifier that identifies the destination of the message; and
         a distinguishing feature that distinguishes the message from at least one other message in the composite sequence that is from the same source to the same destination;
   constructing a sequence graph from the composite sequence by:
      generating, for each message in the composite sequence, a tuple from the distinguishing feature of the message and at least one of:
         the source identifier of the message; and
         the destination identifier of the message;
      adding, for each unique tuple that is generated, a node to the sequence graph to represent messages in the composite sequence whose tuple equals the unique tuple; and
      adding, for each sequence transition in the composite sequence from an immediately-preceding message to an immediately-succeeding message, an edge to the sequence graph to:
         represent the sequence transition; and
         connect the node that represents the tuple of the sequence transition's immediately-preceding message to the node that represents the tuple of the sequence transition's immediately-succeeding message;
   traversing the sequence graph to discover the first obscure cyclic sequence; and
   performing a security action using a representation of the first obscure cyclic sequence.

2. The computer-implemented method of claim 1, wherein:
   the first computing device comprises a supervisory station of an industrial control system;
   the second computing device comprises an industrial device of the industrial control system;
   the source identifier and the destination identifier of each message in the composite sequence comprise a transport-layer identifier; and
   the distinguishing feature of each message in the composite sequence comprises a length of an application-layer payload of the message.

3. The computer-implemented method of claim 1, wherein collecting the composite sequence comprises:
   logging the distinguishing feature of each message in the composite sequence;
   logging an order in which each message in the composite sequence was observed; and
   logging a time at which each message in the composite sequence was observed.

4. The computer-implemented method of claim 1, wherein:
   constructing the sequence graph further comprises:
      analyzing times at which messages in the composite sequence were observed;
      discovering, based at least in part on analyzing the times, a tuple of the first message in the first obscure cyclic sequence; and
      discovering, based at least in part on analyzing the times, a tuple of the last message in the first obscure cyclic sequence; and
   traversing the sequence graph to discover the first obscure cyclic sequence comprises traversing the sequence graph from a representation of the first message to a representation of the last message to discover a tuple of at least one intermediate message of the first obscure cyclic sequence.

5. The computer-implemented method of claim 4, wherein constructing the sequence graph further comprises:
   creating, for each node in the sequence graph, a dictionary of sequence transitions; and
   adding, for each sequence transition in the composite sequence whose preceding message's tuple is equal to the tuple that is represented by the node, an entry to the dictionary to represent the sequence transition, wherein:
      the entry comprises:
         a succeeding-message tuple that is equal to the tuple of the sequence transition's succeeding message;
         a transition order that is equal to the order of the sequence transition in the composite sequence; and
         a time interval equal to the amount of time between observances of the sequence transition's preceding message and the sequence transition's succeeding message; and the edge that connects the nodes that represent the tuples of the sequence transition's preceding and succeeding messages comprises a directed edge that is incident from the node that represents the tuple of the sequence transition's preceding message and incident to the node that represents the tuple of the sequence transition's succeeding message.

6. The computer-implemented method of claim 5, wherein:
traversing the sequence graph from the representation of the first message to the representation of the last message comprises determining a tuple of the second message in the first obscure cyclic sequence by:
visiting a node in the sequence graph;
locating an entry in the node's dictionary whose succeeding-message tuple is equal to the tuple of the first message;
traversing the sequence graph along a directed edge incident from the node and incident to an adjacent node;
locating an adjacent entry in the adjacent node's dictionary whose transition order is one more than the transition order of the entry; and
determining, based at least in part on locating the adjacent entry in the adjacent node's dictionary, that the tuple of the second message is the same as the succeeding-message tuple of the adjacent entry; and
the representation of the first message comprises the entry.

7. The computer-implemented method of claim 6, wherein:
traversing the sequence graph from the representation of the first message to the representation of the last message further comprises determining a tuple of the second-to-last message in the first obscure cyclic sequence by:
visiting, after traversing the sequence graph along the directed edge incident from the node and incident to the adjacent node, an additional node in the sequence graph;
locating an additional entry in the additional node's dictionary whose succeeding-message tuple is equal to the tuple of the last message; and
determining, based at least in part on locating the additional entry, that the tuple of the second-to-last message is equal to the tuple represented by the additional node; and
the representation of the last message comprises the additional entry.

8. The computer-implemented method of claim 4, wherein:
analyzing the times comprises:
identifying a plurality of messages in the composite sequence whose tuples match; and
identifying, for each message in the plurality of messages, a time interval that is equal to the amount of time between observances of the message and an immediately preceding message in the composite sequence; and
discovering the tuple of the first message comprises:
determining that a variation in the time intervals of the plurality of messages is greater than a predetermined threshold; and
determining, based at least in part on the variation being greater than the predetermined threshold, that the tuple of the first message is the same as the tuples of the plurality of messages.

9. The computer-implemented method of claim 4, wherein:
analyzing the times comprises:
identifying a plurality of messages in the composite sequence whose tuples match; and
identifying, for each message in the plurality of messages, a time interval that is equal to the amount of time between observances of the message and an immediately preceding message in the composite sequence; and
discovering the tuple of the first message comprises:
determining that an average of the time intervals of the plurality of messages is greater than a predetermined threshold; and
determining, based at least in part on the average being greater than the predetermined threshold, that the tuple of the first message is the same as the tuples of the plurality of messages.

10. The computer-implemented method of claim 4, wherein:
analyzing the times comprises:
identifying a plurality of messages in the composite sequence whose tuples match; and
identifying, for each message in the plurality of messages, a time interval that is equal to the amount of time between observances of the message and an immediately succeeding message in the composite sequence; and
discovering the tuple of the last message comprises:
determining that a variation in the time intervals of the plurality of messages is greater than a predetermined threshold; and
determining, based at least in part on the variation being greater than the predetermined threshold, that the tuple of the last message is the same as the tuples of the plurality of messages.

11. The computer-implemented method of claim 4, wherein:
analyzing the times comprises:
identifying a plurality of messages in the composite sequence whose tuples match; and
identifying, for each message in the plurality of messages, a time interval that is equal to the amount of time between observances of the message and an immediately succeeding message in the composite sequence; and
discovering the tuple of the last message comprises:
determining that an average of the time intervals of the plurality of messages is greater than a predetermined threshold; and
determining, based at least in part on the average being greater than the predetermined threshold, that the tuple of the last message is the same as the tuples of the plurality of messages.

12. The computer-implemented method of claim 1, wherein traversing the sequence graph to discover the first obscure cyclic sequence comprises traversing the sequence graph to discover each instance of the first obscure cyclic sequence in the composite sequence.

13. The computer-implemented method of claim 1, wherein performing the security action comprises:
monitoring an additional composite sequence of transport-layer messages that are exchanged between the first computing device and the second computing device; and using the representation of the first obscure cyclic sequence to detect an anomaly in the additional composite sequence.

14. The computer-implemented method of claim 1, wherein performing the security action comprises:
compiling a dataset that comprises at least each instance of the first obscure cyclic sequence in the composite sequence; and
performing deep packet inspection on the dataset to discover at least one of a common field, a random field, and a discrete field of an application-layer message in the first obscure cyclic sequence.

15. A system for detecting obscure cyclic application-layer message sequences in transport-layer message sequences, the system comprising:
a collecting module, stored in memory, that collects a composite sequence of transport-layer messages that are exchanged between a first computing device and a second computing device over a single long-standing transport-layer connection, wherein:
the composite sequence comprises at least a first obscure cyclic sequence of application-layer messages and a second obscure cyclic sequence of application-layer messages that were exchanged by the first computing device and the second computing device; and
each message in the composite sequence comprises:
at least one source identifier that identifies the source of the message;
at least one destination identifier that identifies the destination of the message; and
a distinguishing feature that distinguishes the message from at least one other message in the composite sequence that is from the same source to the same destination;
a constructing module, stored in memory, that constructs a sequence graph from the composite sequence by:
generating, for each message in the composite sequence, a tuple from the distinguishing feature of the message and at least one of:
the source identifier of the message; and
the destination identifier of the message;
adding, for each unique tuple that is generated, a node to the sequence graph to represent messages in the composite sequence whose tuple equals the unique tuple; and
adding, for each sequence transition in the composite sequence from an immediately-preceding message to an immediately-succeeding message, an edge to the sequence graph to:
represent the sequence transition; and
connect the node that represents the tuple of the sequence transition's immediately-preceding message to the node that represents the tuple of the sequence transition's immediately-succeeding message;
a traversing module, stored in memory, that traverses the sequence graph to discover the first obscure cyclic sequence;
a security module, stored in memory, that performs a security action using a representation of the first obscure cyclic sequence; and
at least one physical processor that executes the collecting module, the constructing module, the traversing module, and the security module.

16. The system of claim 15, wherein:
the first computing device comprises a supervisory station of an industrial control system;
the second computing device comprises an industrial device of the industrial control system;
the source identifier and the destination identifier of each message in the composite sequence comprise a transport-layer identifier; and
the distinguishing feature of each message in the composite sequence comprises a length of an application-layer payload of the message.

17. The system of claim 15, wherein the collecting module collects the composite sequence by:
logging the distinguishing feature of each message in the composite sequence;
logging an order in which each message in the composite sequence was observed; and
logging a time at which each message in the composite sequence was observed.

18. The system of claim 15, wherein:
the constructing module constructs the sequence graph by further:
analyzing times at which messages in the composite sequence were observed;
discovering, based at least in part on analyzing the times, a tuple of the first message in the first obscure cyclic sequence; and
discovering, based at least in part on analyzing the times, a tuple of the last message in the first obscure cyclic sequence; and
the traversing module traverses the sequence graph to discover the first obscure cyclic sequence by traversing the sequence graph from a representation of the first message to a representation of the last message to discover a tuple of at least one intermediate message of the first obscure cyclic sequence.

19. The system of claim 18, wherein the constructing module constructs the sequence graph by further:
creating, for each node in the sequence graph, a dictionary of sequence transitions; and
adding, for each sequence transition in the composite sequence whose preceding message's tuple is equal to the tuple that is represented by the node, an entry to the dictionary to represent the sequence transition, wherein:
the entry comprises:
a succeeding-message tuple that is equal to the tuple of the sequence transition's succeeding message;
a transition order that is equal to the order of the sequence transition in the composite sequence; and
a time interval equal to the amount of time between observances of the sequence transition's preceding message and the sequence transition's succeeding message; and
the edge that connects the nodes that represent the tuples of the sequence transition's preceding and succeeding messages comprises a directed edge that is incident from the node that represents the tuple of the sequence transition's preceding message and incident to the node that represents the tuple of the sequence transition's succeeding message.

20. A non-transitory computer-readable medium comprising one or more computer-executable instructions that, when executed by at least one processor of a computing device, cause the computing device to:
collect a composite sequence of transport-layer messages that are exchanged between a first computing device and a second computing device over a single long-standing transport-layer connection, wherein:
the composite sequence comprises at least a first obscure cyclic sequence of application-layer messages and a second obscure cyclic sequence of application-layer messages that were exchanged by the first computing device and the second computing device; and
each message in the composite sequence comprises:
at least one source identifier that identifies the source of the message;
at least one destination identifier that identifies the destination of the message; and
a distinguishing feature that distinguishes the message from at least one other message in the composite sequence that is from the same source to the same destination;
construct a sequence graph from the composite sequence by:
generating, for each message in the composite sequence, a tuple from the distinguishing feature of the message and at least one of:
the source identifier of the message; and
the destination identifier of the message;
adding, for each unique tuple that is generated, a node to the sequence graph to represent messages in the composite sequence whose tuple equals the unique tuple; and
adding, for each sequence transition in the composite sequence from an immediately-preceding message to an immediately-succeeding message, an edge to the sequence graph to:
represent the sequence transition; and
connect the node that represents the tuple of the sequence transition's immediately-preceding message to the node that represents the tuple of the sequence transition's immediately-succeeding message;
traverse the sequence graph to discover the first obscure cyclic sequence; and
perform a security action using a representation of the first obscure cyclic sequence.

* * * * *